(12) United States Patent
Maeda et al.

(10) Patent No.: US 8,185,705 B2
(45) Date of Patent: May 22, 2012

(54) INFORMATION RECORDING MEDIUM, INFORMATION RECORDING MEDIUM ACCESSING APPARATUS AND ACCESSING METHOD

(75) Inventors: Takuji Maeda, Osaka (JP); Masahiro Nakanishi, Kyoto (JP); Shinji Inoue, Osaka (JP); Hirokazu Sou, Osaka (JP)

(73) Assignee: Panasonic Corporation, Osaka (JP)

( * ) Notice: Subject to any disclaimer, the term of this patent is extended or adjusted under 35 U.S.C. 154(b) by 685 days.

(21) Appl. No.: 10/577,418

(22) PCT Filed: Oct. 28, 2004

(86) PCT No.: PCT/JP2004/016029
§ 371 (c)(1),
(2), (4) Date: Apr. 27, 2006

(87) PCT Pub. No.: WO2005/043394
PCT Pub. Date: May 12, 2005

(65) Prior Publication Data
US 2007/0033364 A1 Feb. 8, 2007

(30) Foreign Application Priority Data

Oct. 31, 2003 (JP) ................................ 2003-372484
May 10, 2004 (JP) ................................ 2004-139582

(51) Int. Cl.
*G06F 12/00* (2006.01)
*G06F 13/00* (2006.01)
*G06F 13/28* (2006.01)

(52) U.S. Cl. ........ 711/154; 711/112; 711/115; 711/170; 711/171; 711/E12.001

(58) Field of Classification Search .................. 711/112, 711/115, 154, 171
See application file for complete search history.

(56) References Cited

U.S. PATENT DOCUMENTS

| | | | |
|---|---|---|---|
| 5,724,544 A | 3/1998 | Nishi | |
| 6,144,607 A * | 11/2000 | Sassa | 365/230.03 |
| 6,466,476 B1 * | 10/2002 | Wong et al. | 365/189.15 |
| 6,601,056 B1 * | 7/2003 | Kagle et al. | 707/1 |
| 2005/0080985 A1 | 4/2005 | Sasaki et al. | |
| 2005/0216684 A1 | 9/2005 | So et al. | |
| 2005/0231765 A1 | 10/2005 | So et al. | |

(Continued)

FOREIGN PATENT DOCUMENTS
CN 1332932 A 1/2002
(Continued)

OTHER PUBLICATIONS
English translation of Detailed Description of JP 2000-181784 A.*
(Continued)

*Primary Examiner* — Michael Alsip
(74) *Attorney, Agent, or Firm* — Greenblum & Bernstein, P.L.C.

(57) ABSTRACT

An information recording medium such as a semiconductor memory card includes a first semiconductor memory having a first recording area accessed by a relatively small access unit and storing file system management information, a second semiconductor memory having a second recording area accessed by a relatively large access unit and storing file data (file entity data), and a controller for controlling the first and second semiconductor memories. The information recording medium selects either one of recording areas of the first and second semiconductor memories depending on the data type, and writes data into the selected recording area.

14 Claims, 22 Drawing Sheets

U.S. PATENT DOCUMENTS

2006/0050622 A1 3/2006 So et al.

FOREIGN PATENT DOCUMENTS

| | | |
|---|---|---|
| EP | 1498817 | 1/2005 |
| JP | 4-263386 | 9/1992 |
| JP | 6-52691 | 2/1994 |
| JP | 6-139138 | 5/1994 |
| JP | 9-153250 | 6/1997 |
| JP | 10-283230 | 10/1998 |
| JP | 10-307749 | 11/1998 |
| JP | 11-17908 | 1/1999 |
| JP | 11 39210 | 2/1999 |
| JP | 2000-181784 | 6/2000 |
| JP | 2000-285000 | 10/2000 |
| JP | 2001-325135 | 11/2001 |
| JP | 2002-91806 | 3/2002 |
| JP | 2002-163139 | 6/2002 |
| JP | 2002-540645 A | 11/2002 |
| JP | 2003-308240 | 10/2003 |
| WO | 00/40020 | 7/2000 |
| WO | 03/088044 | 10/2003 |

OTHER PUBLICATIONS

ISO/IEC 9293, "Information Technology—Volume and file structure of disk cartridge for information," (1994).

Optical Storage Technology Association, "Universal Disk Format Specification Revision 1.50)," (1997).

English language abstract of JP 2002-91806.
English language Abstract of JP 2001-325135.
English language abstract of JP 11-17908.
English language abstract of JP 6-139138.
English language abstract of JP 9-153250.
U.S. Appl. No. 10/546,453 to Inoue et al, filed Feb. 19, 2004.
U.S. Appl. No. 10/578,373 to So et al., filed May 5, 2006.
U.S. Appl. No. 10/578,372 to Maeda et al., filed May 5, 2006.
English language abstract of JP 2000-181784.
English language abstract of JP 10-283230.
English language abstract of JP 11-39210.
English language abstract of JP 10-307749.
English language abstract of JP 6-52691.
English language abstract of JP 4-263383.
English language abstract of JP 2000-285000.
English language abstract of JP 2003-308240.
English language abstract of JP 2002-163139.
English Language Abstract of JP 4-263386.
English language Abstract of WO 00/40020 (Jul. 6, 2000).
English language Abstract of FR2787963.

* cited by examiner

Fig. 14

51 LOGICAL-PHYSICAL ADDRESS CONVERSION TABLE

| | | LOGICAL ADDRESS (LOWER 5 BITS) | | | | | | |
|---|---|---|---|---|---|---|---|---|
| | | 0 | 1 | 2 | 3 | 4 | ... | 30 | 31 |
| LOGICAL ADDRESS | 0~31 | 320 | 321 | 322 | 323 | 324 | | 350 | 351 |
| | 32~63 | 352 | 353 | 354 | 355 | 356 | | 382 | 383 |
| | 64~95 | 384 | 385 | 386 | 387 | 388 | | 414 | 415 |
| | 96~127 | 416 | 417 | 418 | 419 | 420 | | 446 | 447 |
| | 128~159 | - | - | - | - | - | ... | - | - |
| | 160~191 | - | - | - | - | - | | - | - |
| | 192~223 | - | - | - | - | - | | - | - |
| | 224~255 | - | - | - | - | - | | - | - |

53 LINK TABLE

| | | PHYSICAL ADDRESS (LOWER 5 BITS) | | | | | | | |
|---|---|---|---|---|---|---|---|---|---|
| | | 0 | 1 | 2 | 3 | 4 | ... | 30 | 31 | |
| PHYSICAL ADDRESS | 0~31 | 11 | 11 | 11 | 11 | 11 | | 11 | 11 | FOR FIRST RECORDING AREA |
| | 32~63 | 11 | 11 | 11 | 11 | 11 | | 11 | 11 | |
| | 64~95 | 11 | 11 | 11 | 11 | 11 | | 11 | 11 | |
| | ⋮ | ⋮ | ⋮ | ⋮ | ⋮ | ⋮ | | ⋮ | ⋮ | |
| | 320~351 | 00 | 00 | 00 | 00 | 00 | ... | 00 | 00 | FOR SECOND RECORDING AREA |
| | 352~383 | 00 | 00 | 00 | 00 | 00 | | 00 | 00 | |
| | 384~415 | 00 | 00 | 00 | 00 | 00 | | 00 | 00 | |
| | 416~447 | 00 | 00 | 00 | 00 | 00 | | 00 | 00 | |
| | 448~479 | 11 | 11 | 11 | 11 | 11 | | 11 | 11 | |

00: VALID BLOCK
11: INVALID BLOCK (ERASED)
10: INVALID BLOCK (NOT ERASED)

Fig. 15B

| Seq. | COMMAND SEQUENCE |
|---|---|
| 1 | SET POSITION INFORMATION OF FILE SYSTEM MANAGEMENT INFORMATION (FAT1):SetFSInfoAddr(addr=32, size=1) |
| 2 | SET POSITION INFORMATION OF FILE SYSTEM MANAGEMENT INFORMATION (FAT2):SetFSInfoAddr(addr=34, size=1) |
| 3 | SET POSITION INFORMATION OF FILE SYSTEM MANAGEMENT INFORMATION (DIR):SetFSInfoAddr(addr=64, size=1) |
| 4 | WRITE 16KB OF DATA:Write(addr=128, size=32) |
| 5 | WRITE FAT1:Write(addr=32, size=1) |
| 6 | WRITE FAT2:Write(addr=34, size=1) |
| 7 | WRITE DIR:Write(addr=64, size=1) |
| 8 | WRITE 16KB OF DATA:Write(addr=160, size=32) |
| 9 | WRITE FAT1:Write(addr=32, size=1) |
| 10 | WRITE FAT2:Write(addr=34, size=1) |
| 11 | WRITE DIR:Write(addr=64, size=1) |
| 12 | AFTERWARD, WRITE SIMILARLY FAT1, FAT2, AND DIR REPEATEDLY |

Fig. 18

51 LOGICAL-PHYSICAL ADDRESS CONVERSION TABLE

| LOGICAL ADDRESS | LOGICAL ADDRESS (LOWER 5 BITS) | | | | | | | |
|---|---|---|---|---|---|---|---|---|
| | | 0 | 1 | 2 | 3 | 4 | ... | 30 | 31 |
| | 0~31 | 320 | 321 | 322 | 323 | 324 | | 350 | 351 |
| | 32~63 | 0 | 1 | 2 | 3 | 4 | | 30 | 31 |
| | 64~95 | 32 | 33 | 34 | 35 | 36 | | 62 | 63 |
| | 96~127 | 416 | 417 | 418 | 419 | 420 | ... | 446 | 447 |
| | 128~159 | - | - | - | - | - | | - | - |
| | 160~191 | - | - | - | - | - | | - | - |
| | 192~223 | - | - | - | - | - | | - | - |
| | 224~255 | - | - | - | - | - | | - | - |

53 LINK TABLE

| PHYSICAL ADDRESS | PHYSICAL ADDRESS (LOWER 5 BITS) | | | | | | | |
|---|---|---|---|---|---|---|---|---|
| | | 0 | 1 | 2 | 3 | 4 | ... | 30 | 31 |
| | 0~31 | 00 | 00 | 00 | 00 | 00 | | 00 | 00 |
| | 32~63 | 00 | 00 | 00 | 00 | 00 | | 00 | 00 |
| | 64~95 | 11 | 11 | 11 | 11 | 11 | | 11 | 11 |
| | ⋮ | ⋮ | ⋮ | ⋮ | ⋮ | ⋮ | | ⋮ | ⋮ |
| | 320~351 | 00 | 00 | 00 | 00 | 00 | ... | 00 | 00 |
| | 352~383 | 11 | 11 | 11 | 11 | 11 | | 11 | 11 |
| | 384~415 | 11 | 11 | 11 | 11 | 11 | | 11 | 11 |
| | 416~447 | 00 | 00 | 00 | 00 | 00 | | 00 | 00 |
| | 448~479 | 11 | 11 | 11 | 11 | 11 | | 11 | 11 |

FOR FIRST RECORDING AREA (rows 0~31 through 320~351's upper portion)

FOR SECOND RECORDING AREA (rows 352~383 through 448~479)

Fig. 19

51 LOGICAL-PHYSICAL ADDRESS CONVERSION TABLE

| | LOGICAL ADDRESS (LOWER 5 BITS) | | | | | | | |
|---|---|---|---|---|---|---|---|---|
| | 0 | 1 | 2 | 3 | 4 | ... | 30 | 31 |
| 0~31 | 320 | 321 | 322 | 323 | 324 | | 350 | 351 |
| 32~63 | 0 | 1 | 2 | 3 | 4 | | 30 | 31 |
| 64~95 | 32 | 33 | 34 | 35 | 36 | | 62 | 63 |
| 96~127 | 416 | 417 | 418 | 419 | 420 | | 446 | 447 |
| 128~159 | 352 | 353 | 354 | 355 | 356 | ... | 382 | 383 |
| 160~191 | - | - | - | - | - | | - | - |
| 192~223 | - | - | - | - | - | | - | - |
| 224~255 | - | - | - | - | - | | - | - |

(Row labels left side: LOGICAL ADDRESS)

53 LINK TABLE

| | PHYSICAL ADDRESS (LOWER 5 BITS) | | | | | | | | |
|---|---|---|---|---|---|---|---|---|---|
| | 0 | 1 | 2 | 3 | 4 | ... | 30 | 31 | |
| 0~31 | 00 | 00 | 00 | 00 | 00 | | 00 | 00 | FOR FIRST RECORDING AREA |
| 32~63 | 00 | 00 | 00 | 00 | 00 | | 00 | 00 | |
| 64~95 | 11 | 11 | 11 | 11 | 11 | | 11 | 11 | |
| ⋮ | ⋮ | ⋮ | ⋮ | ⋮ | ⋮ | | ⋮ | ⋮ | |
| 320~351 | 00 | 00 | 00 | 00 | 00 | ... | 00 | 00 | FOR SECOND RECORDING AREA |
| 352~383 | 00 | 00 | 00 | 00 | 00 | | 00 | 00 | |
| 384~415 | 11 | 11 | 11 | 11 | 11 | | 11 | 11 | |
| 416~447 | 00 | 00 | 00 | 00 | 00 | | 00 | 00 | |
| 448~479 | 11 | 11 | 11 | 11 | 11 | | 11 | 11 | |

(Row labels left side: PHYSICAL ADDRESS)

Fig. 20

51 LOGICAL-PHYSICAL ADDRESS CONVERSION TABLE

| LOGICAL ADDRESS | LOGICAL ADDRESS (LOWER 5 BITS) | | | | | | | |
|---|---|---|---|---|---|---|---|---|
| | | 0 | 1 | 2 | 3 | 4 | ... | 30 | 31 |
| | 0~31 | 320 | 321 | 322 | 323 | 324 | | 350 | 351 |
| | 32~63 | 64 | 1 | 65 | 3 | 4 | | 30 | 31 |
| | 64~95 | 66 | 33 | 34 | 35 | 36 | | 62 | 63 |
| | 96~127 | 416 | 417 | 418 | 419 | 420 | | 446 | 447 |
| | 128~159 | 352 | 353 | 354 | 355 | 356 | ... | 382 | 383 |
| | 160~191 | - | - | - | - | - | | - | - |
| | 192~223 | - | - | - | - | - | | - | - |
| | 224~255 | - | - | - | - | - | | - | - |

53 LINK TABLE

| PHYSICAL ADDRESS | PHYSICAL ADDRESS (LOWER 5 BITS) | | | | | | | |
|---|---|---|---|---|---|---|---|---|
| | | 0 | 1 | 2 | 3 | 4 | ... | 30 | 31 |
| | 0~31 | 10 | 00 | 10 | 00 | 00 | | 00 | 00 |
| | 32~63 | 10 | 00 | 00 | 00 | 00 | | 00 | 00 |
| | 64~95 | 00 | 00 | 00 | 11 | 11 | | 11 | 11 |
| | ⋮ | ⋮ | ⋮ | ⋮ | ⋮ | ⋮ | | ⋮ | ⋮ |
| | 320~351 | 00 | 00 | 00 | 00 | 00 | ... | 00 | 00 |
| | 352~383 | 00 | 00 | 00 | 00 | 00 | | 00 | 00 |
| | 384~415 | 11 | 11 | 11 | 11 | 11 | | 11 | 11 |
| | 416~447 | 00 | 00 | 00 | 00 | 00 | | 00 | 00 |
| | 448~479 | 11 | 11 | 11 | 11 | 11 | | 11 | 11 |

Rows 0~31 through 64~95: FOR FIRST RECORDING AREA

Rows 320~351 through 448~479: FOR SECOND RECORDING AREA

Fig. 21

51 LOGICAL-PHYSICAL ADDRESS CONVERSION TABLE

| LOGICAL ADDRESS | LOGICAL ADDRESS (LOWER 5 BITS) | | | | | | | |
|---|---|---|---|---|---|---|---|---|
| | | 0 | 1 | 2 | 3 | 4 | ... | 30 | 31 |
| | 0~31 | 320 | 321 | 322 | 323 | 324 | | 350 | 351 |
| | 32~63 | 64 | 1 | 65 | 3 | 4 | | 30 | 31 |
| | 64~95 | 66 | 33 | 34 | 35 | 36 | | 62 | 63 |
| | 96~127 | 416 | 417 | 418 | 419 | 420 | | 446 | 447 |
| | 128~159 | 352 | 353 | 354 | 355 | 356 | | 382 | 383 |
| | 160~191 | 384 | 385 | 386 | 387 | 388 | | 414 | 415 |
| | 192~223 | - | - | - | - | - | | - | - |
| | 224~255 | - | - | - | - | - | | - | - |

53 LINK TABLE

| PHYSICAL ADDRESS | PHYSICAL ADDRESS (LOWER 5 BITS) | | | | | | | |
|---|---|---|---|---|---|---|---|---|
| | | 0 | 1 | 2 | 3 | 4 | ... | 30 | 31 |
| | 0~31 | 10 | 00 | 10 | 00 | 00 | | 00 | 00 |
| | 32~63 | 10 | 00 | 00 | 00 | 00 | | 00 | 00 |
| | 64~95 | 00 | 00 | 00 | 11 | 11 | | 11 | 11 |
| | ⋮ | ⋮ | ⋮ | ⋮ | ⋮ | ⋮ | | ⋮ | ⋮ |
| | 320~351 | 00 | 00 | 00 | 00 | 00 | | 00 | 00 |
| | 352~383 | 00 | 00 | 00 | 00 | 00 | | 00 | 00 |
| | 384~415 | 00 | 00 | 00 | 00 | 00 | | 00 | 00 |
| | 416~447 | 00 | 00 | 00 | 00 | 00 | | 00 | 00 |
| | 448~479 | 11 | 11 | 11 | 11 | 11 | | 11 | 11 |

FOR FIRST RECORDING AREA (rows 0~31 through 64~95)

FOR SECOND RECORDING AREA (rows 320~351 through 448~479)

INFORMATION RECORDING MEDIUM, INFORMATION RECORDING MEDIUM ACCESSING APPARATUS AND ACCESSING METHOD

TECHNICAL FIELD

The present invention relates to an information recording medium capable of writing and reading data from an external device, and more particularly to an information recording medium for managing the data to be stored with a file system, and an accessing apparatus for the information recording medium.

BACKGROUND ART

Recording media recording digital data such as music content and video data are available in various types including magnetic disk, optical disk, and magneto-optical disk. A semiconductor memory card which is one of such recording media mainly uses a nonvolatile semiconductor memory such as flash ROM as storage device, and can be reduced in the size of recording medium, and it is widely used in digital still camera, mobile telephone terminal, and other small portable appliances.

Data stored in the semiconductor memory card is managed by a file system by which users can easily handle the stored data as a file. File systems known hitherto include FAT file system (see non-patent document 1), UDF file system (Universal Disk Format) (see non-patent document 2), and NTFS file system (New Technology File System). Data stored in the semiconductor memory card with data managed by such file systems can be shared with devices which interpret the same file system and exchanged with such devices.

As an example of conventional file systems, FAT file system is explained. In the FAT file system, a management information area exists at the beginning of logical address space used by an accessing apparatus for accessing the semiconductor memory card.

The management information area stores information necessary for file management in a file system such as area assignment unit and size of area managed by the file system. More specifically, the management information area stores file system management information necessary for managing the file data (user data), such as FAT and root directory.

The FAT is an area for storing the information about physical storage position of data contained in the file. Usually the FAT is duplicated so that two FATs having the same information are present in the semiconductor memory card. Thus even if one FAT is broken, the file can be accessed with the other FAT. The root directory entry is an area for storing information (directory entry) of file and directory existing immediately beneath the root directory.

In the FAT file system, there is a data area for storing file entity data (called "file data") in an area following the management information area. The data area is divided to and managed in plural clusters.

Usually, file data is stored in plural clusters. Linkage among clusters is managed by link information stored in the FAT. Information (directory entry) of file and directory existing immediately beneath the root directory is stored in part of the data area.

In the FAT file system, file data is stored, and the directory entry and FAT are rewritten in order to update the information about the storage position and size of file data.

Specifically, in the FAT system, when recording the file data, three pieces of management information (file system management information) relating to the file data, directory entry, and FAT must be written to the semiconductor memory card. Since the file data is managed in the cluster unit of a relatively large size, the writing size to the semiconductor memory card is relatively large, about tens of kB. By contrast, since the file system management information of directory entry and FAT is small in size of data to be updated, it can be written to the semiconductor memory card in a relatively small unit of, for example, 512 bytes. Hence, the size is largely different between the file data and the file system management information such as FAT.

On the other hand, a flash memory generally used as storage device of the semiconductor memory card has characteristic in that it cannot overwrite data after the data is once erased in erase block unit of a specific size. If the cluster size is smaller than the erase block size, the writing speed is lowered when data is written in the cluster unit.

To solve such problems, conventionally, it has been proposed to prevent drop of writing speed by searching consecutive free spaces on the FAT, and writing data to the searched consecutive clusters. According to this method, if the cluster size is smaller than the erase block size, data can be written at high speed (see, for example, patent document 1).

Patent document 1: JP 2002-91806 A

Non-patent document 1: ISO/IEC9293, "Information Technology—Volume and file structure of disk cartridges for information", 1994.

Non-patent document 2: OSTA Universal Disk Format Specification Revision 1.50, 1997.

DISCLOSURE OF INVENTION (Problems to be Solved by the Invention)

Although that method is effective when storing file data of relatively large size to the data area because of achieving high writing speed, it is not effective in the case of data of relatively small size such as file system management information because of resulting in low writing speed.

In data writing process, file system management information is updated in an arbitrary period, such as once in a second. In order to enhance the data writing speed on the whole, it is required to increase the writing speed of file system management information.

The invention is devised to solve these problems, and it is hence an object the invention to present an information recording medium capable of recording both of file system management information and file data differing in size at high speed, and a device and a method of accessing the recording medium.

(Solving Means)

An information recording medium according to the present invention is an information recording medium for storing data managed by a file system, to/from which data is written/read via a command received from outside. The information recording medium includes: a receiving section operable to receive a command and data from outside, a first recording area in which data writing is managed in first access unit, a second recording area in which data writing is managed in second access unit larger than the first access unit, and a controller operable to control access to the first or second recording area according to the received command. When receiving a write command, the controller controls the access so as to select the first or second recording area depending on a data type of the received data and to write the received data to the selected area.

The first recording area may store file system management information necessary for managing the file in the file system, and the second recording area may store entity data of the file managed by the file system.

The data type may include a type indicating entity data, and a type indicating file system management information.

The data type may be specified by an argument of the command, and the controller may judge the data type on the basis of the value of the argument.

A first accessing apparatus according to the invention includes: a slot for loading an information recording medium; an access control section operable to control writing and reading of data in the information recording medium loaded in the slot; and a file system control section operable to control the file system established on the information recording medium loaded in the slot, and transmit data and information about the data type to the information recording medium, when writing to the information recording medium.

A second accessing apparatus according to the invention includes: a FS management information notice section operable to inform the information recording medium of information about position and size of file system management information. The FS management information notice section informs the information recording medium of information about position and size of file system management information, prior to writing of the file system management information.

A control method according to the invention is a control method of information recording medium, for managing data stored in the information recording medium with a file system. The control method includes: managing writing of data to a first recording area in first access unit; managing writing of data to a second recording area in second access unit larger than the first access unit; receiving data and write position together with write command; selecting either one of the first and second recording areas as data writing area depending on data type of the received data; and writing the received data to the selected area.

A first accessing method according to the invention is a method of accessing the information recording medium, and includes transmitting information about data type of writing data to the information recording medium together with a write command.

A second accessing method according to the invention is a method of accessing the information recording medium, includes: transmitting information about position and size of file system management information to the information recording medium to set an area for storing the file system management information in the information recording medium; and transmitting a write command together with data and write address to the information recording medium to write the data.

(Effects of the Invention)

According to the invention, when writing data to information recording medium, data recording area in the information recording medium is changed depending on the type of writing data. Thus, data can be written to an appropriate recording area depending on the data size varying in each data type, resulting in a high speed access totally.

BRIEF DESCRIPTION OF DRAWINGS

FIG. 14 is a diagram of example of address management information in embodiment 2.

FIG. 18 is a diagram of state of address management information after issuance of SetFSInfoAddr command to semiconductor memory card in embodiment 2.

FIG. 19 is a diagram of state of address management information after data writing in a semiconductor memory card in embodiment 2.

FIG. 20 is a diagram of state of address management information after writing of file system management information in a semiconductor memory card in embodiment 2.

FIG. 21 is a diagram of state of address management information after data writing in a semiconductor memory card in embodiment 2.

REFERENCE NUMERALS

Figure 1:
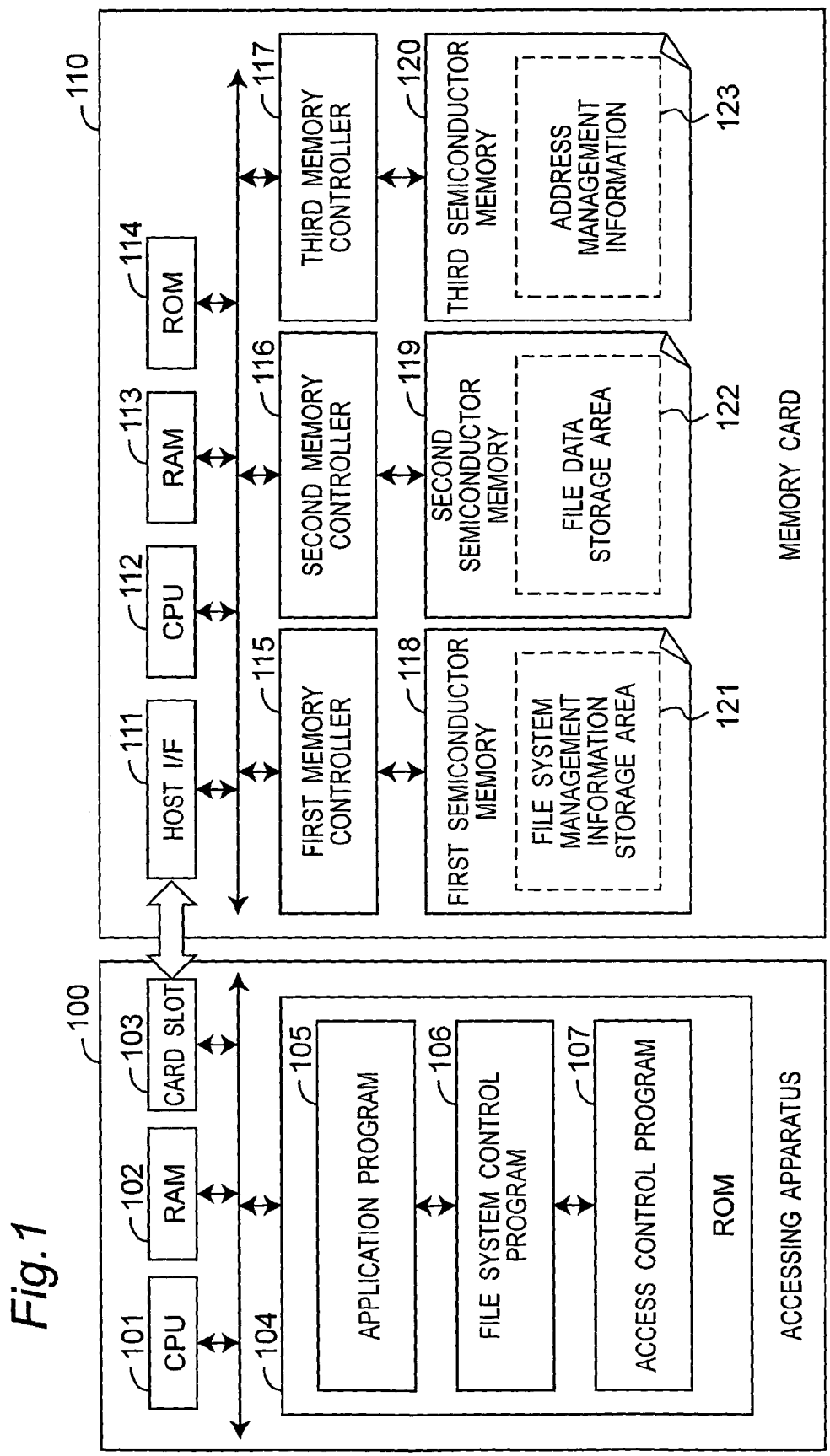
FIG. 1 is a block diagram of a semiconductor memory card and an accessing apparatus according to embodiment 1 of the invention.

26 FS management information storage register
51 logical-physical address conversion table
53 link table
100, 100b accessing apparatus
101, 112 CPU
102, 113 RAM
103 card slot
104, 114 ROM 105 application program
106 file system control program
107 access control program
108 FS management information notice program
110, 110b semiconductor memory card
111 host interface
25, 115, 116, 117 memory controller
27, 118, 119, 120 semiconductor memory
121 file system management information storage area
122 file data storage area
123 address management information

BEST MODE FOR CARRYING OUT THE
INVENTION

Embodiments of semiconductor memory card and accessing apparatus of the invention are described below with reference to the accompanying drawings.
Embodiment 1
(Structure of Semiconductor Memory Card and Accessing Apparatus)
FIG. 1 is a block diagram of example structure of semiconductor memory card and accessing apparatus of the invention. As shown in FIG. 1, an accessing apparatus 100 includes a CPU 101, a RAM 102, a card slot 103, and a ROM 104.

The ROM 104 stores programs 105 to 107 for controlling the accessing apparatus 100, and these programs temporarily use the RAM 102 as working area, and are executed by the CPU 101 to provide specified functions. Specifically, the ROM 104 includes application program 105, file system control program 106, and access control program 107.

The application program 105, file system control program 106, and access control program 107 individually control the entire accessing apparatus 100, control the file system established on the semiconductor memory card 110, and control access of data reading/writing from/to the semiconductor memory card 110.

Specifically, the application program 105 is a program for controlling the application operating on the accessing apparatus 100, and includes a music reproduction program if the accessing apparatus 100 is an audio player, or a still picture imaging program if the accessing apparatus 100 is a digital still camera.

The file system control program 106 cooperates with the CPU 101 to provide a file system control function (file system control means). More specifically, the file system control program 106 provides a function of managing data reading/writing in file from/to the semiconductor memory card 110.

The access control program 107 cooperates with the CPU 101 to provide an access control function (access control means). More specifically, the access control program 107 provides a function of executing data writing/reading in the logical address space established on the semiconductor memory card 110, with designated start address and size for process to be executed.

The slot 103 is a section for coupling the semiconductor memory card 110 with the accessing apparatus 100, by which the control signal and data are exchanged between the accessing apparatus 100 and the semiconductor memory card 110.

The semiconductor memory card 110 includes a host interface 111, a CPU 112, a RAM 113, a ROM 114, memory controllers 115, 116 and 117, and semiconductor memories 118, 119 and 120.

The host interface 111 is an interface for exchanging control signals and data with the accessing apparatus 100.

The ROM 114 stores a program for controlling the semiconductor memory card 110. The control program temporarily uses the RAM 113 as working area, and is run on the CPU 112. That is, the CPU 112 cooperates with the program stored in the ROM 114 to compose control means for controlling the entire operation of the semiconductor memory card 110.

In the embodiment, three semiconductor memories 118, 119 and 120 are present in the semiconductor memory card 110, which are controlled by the corresponding memory controllers 115, 116 and 117.

The first semiconductor memory 118 is composed of a storage device with small rewriting unit. For example, the first semiconductor memory 118 is composed of flash ROM or other flash memory, or FeRAM (Ferroelectric Random Access Memory). The FeRAM has a storage device with small rewriting unit (for example, 1 byte) and long life. In the embodiment, for the sake of simplicity of explanation, the first semiconductor memory 118 is supposed to be composed of flash memory with small rewriting unit (for example, 512 bytes). The first semiconductor memory 118 has a file system management information storage area 121. The file system management information storage area 121 stores file system management information which is necessary for management of files in the file system, such as area management information, file name, and file size.

The second semiconductor memory 119 is composed of a storage device with large rewriting unit (for example, 16 k bytes) and large capacity such as flash ROM, and has a file data storage area 122 for storing data main body (entity data) recorded in file.

The third semiconductor memory 120 is composed of the storage device used in either the first or second semiconductor memory 118 or 119. The third semiconductor memory 120 stores address management information 123 for managing the correspondence between logical address space used by the accessing apparatus 100 and physical address space on the first and second semiconductor memories 118 and 119. The area on the first and second semiconductor memories 118 and 119 corresponds to the logical address space used by the accessing apparatus 100. The accessing apparatus 100 can access the area on the first and second semiconductor memories 118 and 119 using the logical address. By contrast, the area on the third semiconductor memory 120 is used only in internal process of the semiconductor memory card 110 and does not correspond to the logical address space, and thus it cannot be accessed from the accessing apparatus 100.

In the embodiment, as the area accessible from the accessing apparatus 100, two semiconductor memories 118 and 119 mutually different in characteristic are provided in the semiconductor memory card 110. The type of data for writing data to the semiconductor memory card 110 is specified by the accessing apparatus 100, and the semiconductor memory for storing the data is determined depending on the specified type. Accordingly, data can be stored in the semiconductor memory suited to the data characteristic, resulting in high speed access to the semiconductor memory card 110.

Feature of the semiconductor memory used as storage device of the semiconductor memory card 110 in the embodiment is described below. The semiconductor memory can realize an information recording medium with small size and light weight, and the semiconductor memory card using the semiconductor memory is currently establishing a firm foundation as information recording medium in various fields of technology. The semiconductor memory presently used in a semiconductor memory card is mainly a flash memory such as flash ROM. The flash memory has a feature in that, data already stored at the write position must be once erased to bring state of the write position into unused state before writing data, and then new data must be recorded. Herein, the unit of erasing data is called an "erase block", which is managed as a block including a plurality of sectors as minimum unit of access. In this embodiment, the flash memory having such feature is used for a semiconductor memory in the semiconductor memory card 110.

Figure 2:
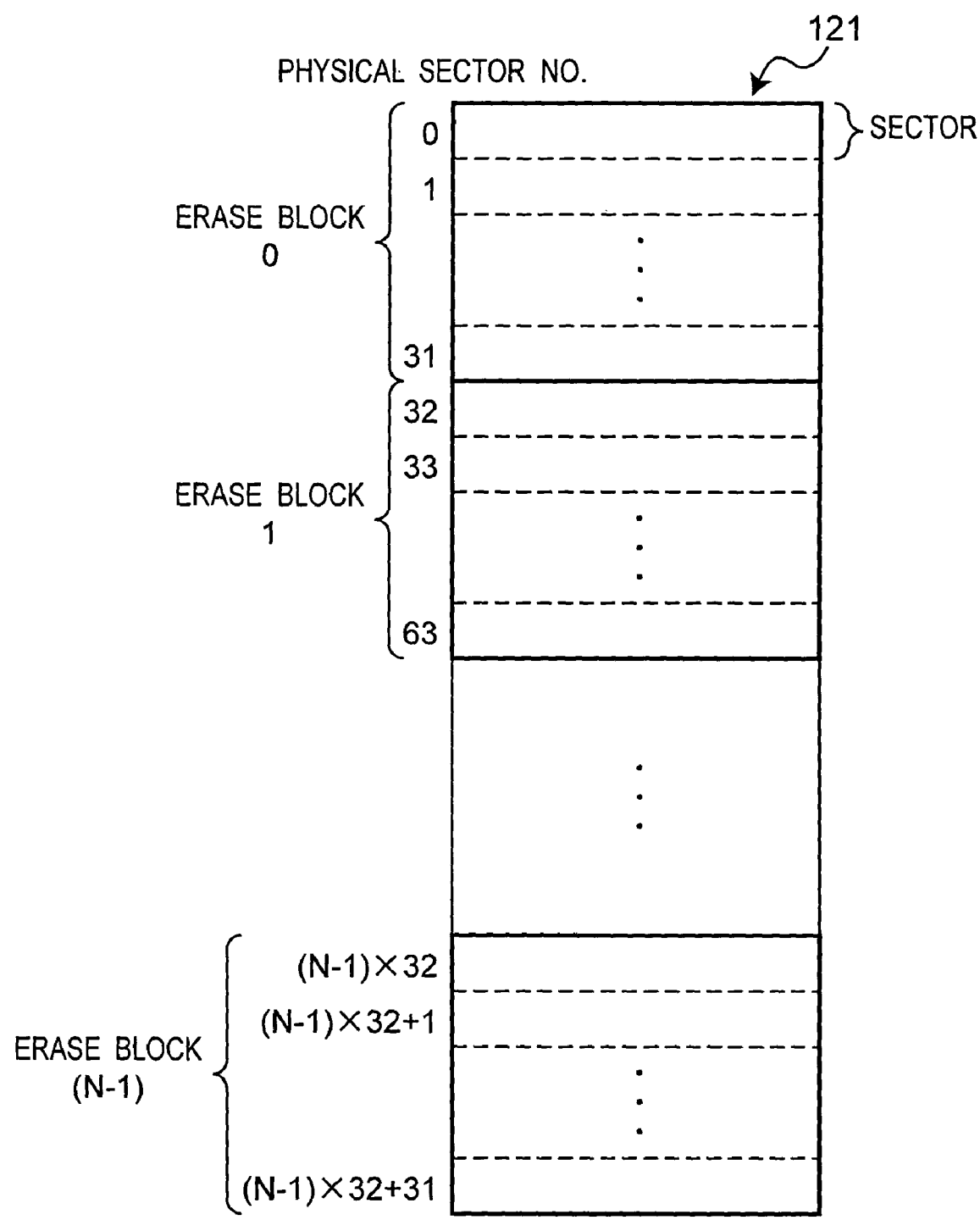
FIG. 2 is a diagram showing relation of erase block and sector in a flash memory.

FIG. 2 is a diagram showing relation of erase block and sector in a flash memory. In the example in FIG. 2, one erase block is composed of 32 sectors, and it can be accessed in sector unit (for example, 512 bytes), while data erasing executed prior to data writing is done in erase block (16 kB) unit.

(Data Writing Process in Semiconductor Memory)

Figure 3:
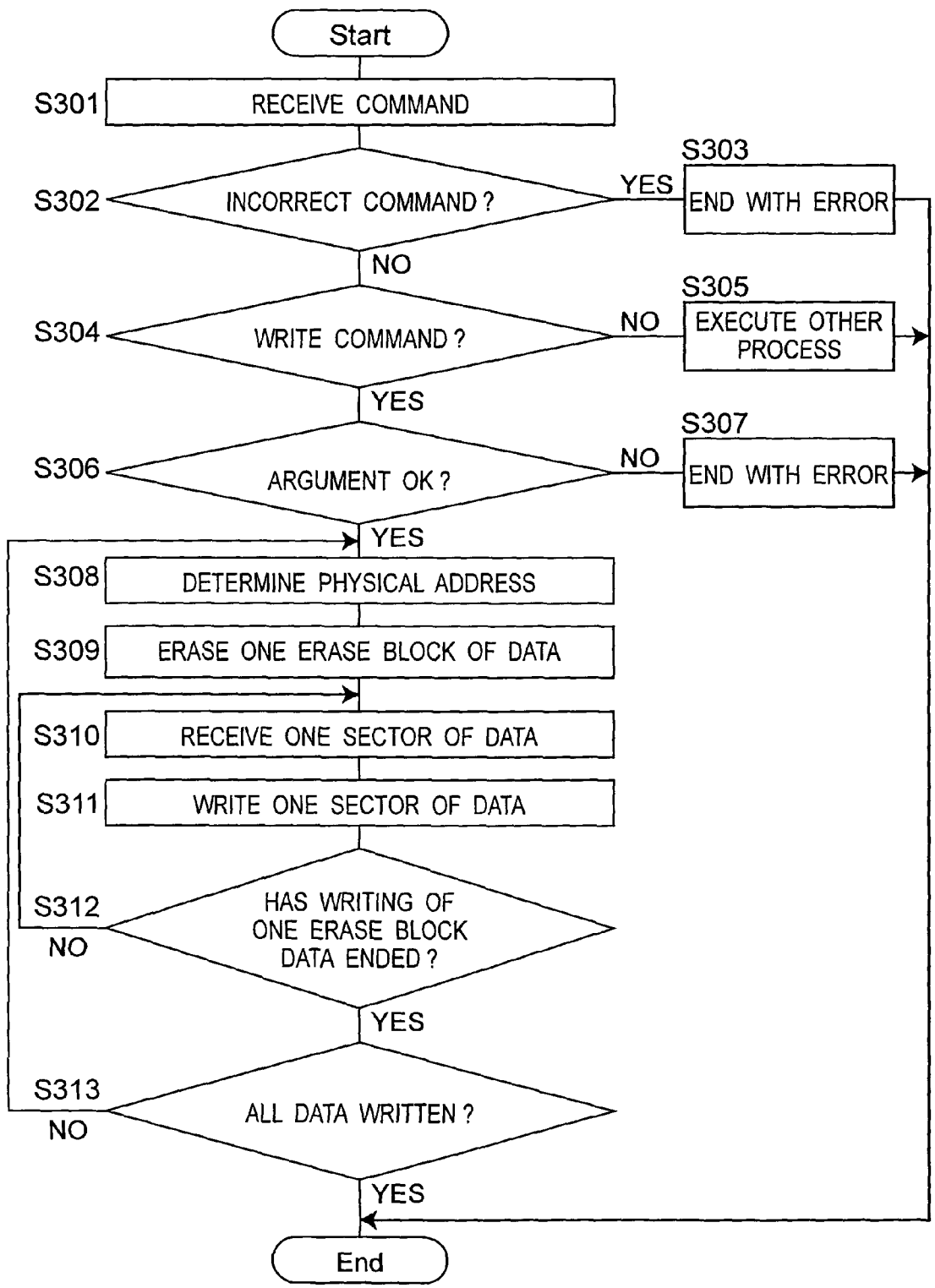
FIG. 3 is a flowchart of writing process of data in double length of the erase block in a semiconductor memory of a semiconductor memory card in embodiment 1.
Figure 4:
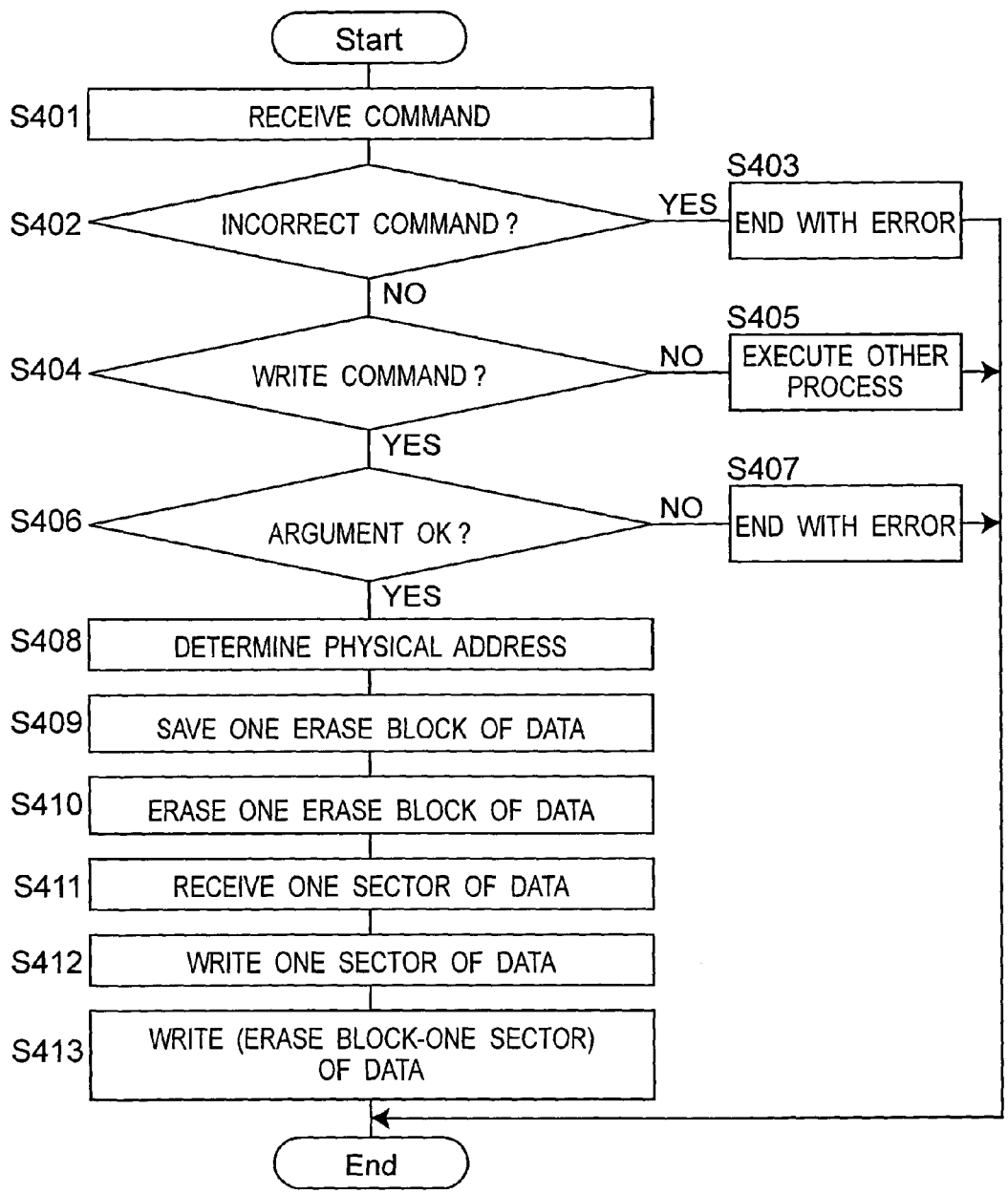
FIG. 4 is a flowchart of writing process of one sector of data in semiconductor memory of semiconductor memory card in embodiment 1.

Referring to FIG. 3 and FIG. 4, data write process in the semiconductor memories 118 and 119 in the semiconductor memory card 110 is explained. FIG. 3 shows data write process for double size of the erase block, and FIG. 4 shows data write process for one sector of data.

First, the process shown in FIG. 3 is explained. The semiconductor memory card 110 receives command and argument transmitted from the accessing apparatus 100 through the host interface 111 (S301). The argument specifies write data position and write data size. Referring to the received command, it is judged whether it is an incorrect command that cannot be recognized by the semiconductor memory card 110 (S302). When the received command is an incorrect command, an error is noticed to the accessing apparatus and the process is terminated (S303). When the received command is a recognizable command, it is judged whether the received command is write command (S304). When the received command is a command other than the write command, other process suited to the received command is executed (S305). When the received command is a write command, the argument specified together with the command is judged to be correct or not (S306). If judged to be incorrect argument, an error is noticed to the accessing apparatus 100 and the process is terminated (S307).

When the argument is judged to be correct, the physical address of the erase block in the semiconductor memory 118 or 119 to which data is to be written actually is determined from information of write position and write size specified in the argument (S308). Prior to writing, data existing in the erase block of the determined physical address is erased by way of the memory controllers 115 and 116 (S309). Next, the semiconductor memory card 110 receives one sector of data from the accessing apparatus 100 through the host interface 111 (S310). When data is received completely, the received one sector of data is written to the semiconductor memories 118 and 119 by way of the memory controllers 115 and 116 (S311). Such data receiving and writing processes (S310 and S311) are repeated until writing of one erase block of data is over (S312). Writing of one erase block of data (steps S308 to S312) is repeated until data with the write size specified from the accessing apparatus 100 is written completely (S313). When data with the write size specified from the accessing apparatus 100 is written completely, the process is terminated.

Data write process for one sector data shown in FIG. 4 is explained. FIG. 4 explains the process of newly writing only data of one sector in one erase block. Accordingly, it differs from the process shown in FIG. 3 in the following points. Prior to data writing, data recorded already in the erase block in which data specified by the argument is to be written is saved to other area (S409), and then one sector of data received from the accessing apparatus 100 is written to that erase block (S412). Further data excluding the one sector of data from the saved data is written to the remaining free area of the erase block (S413).

In the flash memory, the data must be once erased before writing data, and this erase process can be executed in erase block unit only. Thus, even if only one sector of data is written, one erase block of data must be erased as shown at step S410, and the data must be saved as shown at step S409. Further, as shown at step S413, the data already recorded included in the same erase block as the sector in which data is to be updated must be written back to a new erase block.

As shown in FIG. 3 and FIG. 4, data write process is roughly classified in three processes, that is, a command interpretation process, a data erasing process, a and a data recording process. Suppose a flash memory spending 3 msec in overhead of command interpretation, 200 μsec in data recording process for one sector of data, and 2 msec in erasing process of one erase block (16 kB) of data. In writing of one erase block (16 kB) of data to such a flash memory, the process shown in FIG. 3 is executed, and it takes 3 msec in command interpretation, 2 msec in erasing process, and 32×200 μsec in data recording process, resulting in a total of 11.4 msec. Similarly, in writing of one sector data (512 B), the process shown in FIG. 4 is executed, and it takes 3 msec in command interpretation, 2 msec in erasing process, and 200 μsec+31×200 μsec in data recording process, resulting in a total of 11.4 msec. That is, it takes nearly the same time between when data of 16 kB is written and when one sector of data is written. In this example, without consideration of data transfer time, a case of extreme difference in performance is explained, but in the actual flash memory, too, the writing time is the shortest when written in erase block unit.

(FAT File System)

The FAT file system for managing data stored in the semiconductor memory card 110 is explained.

Figure 5:
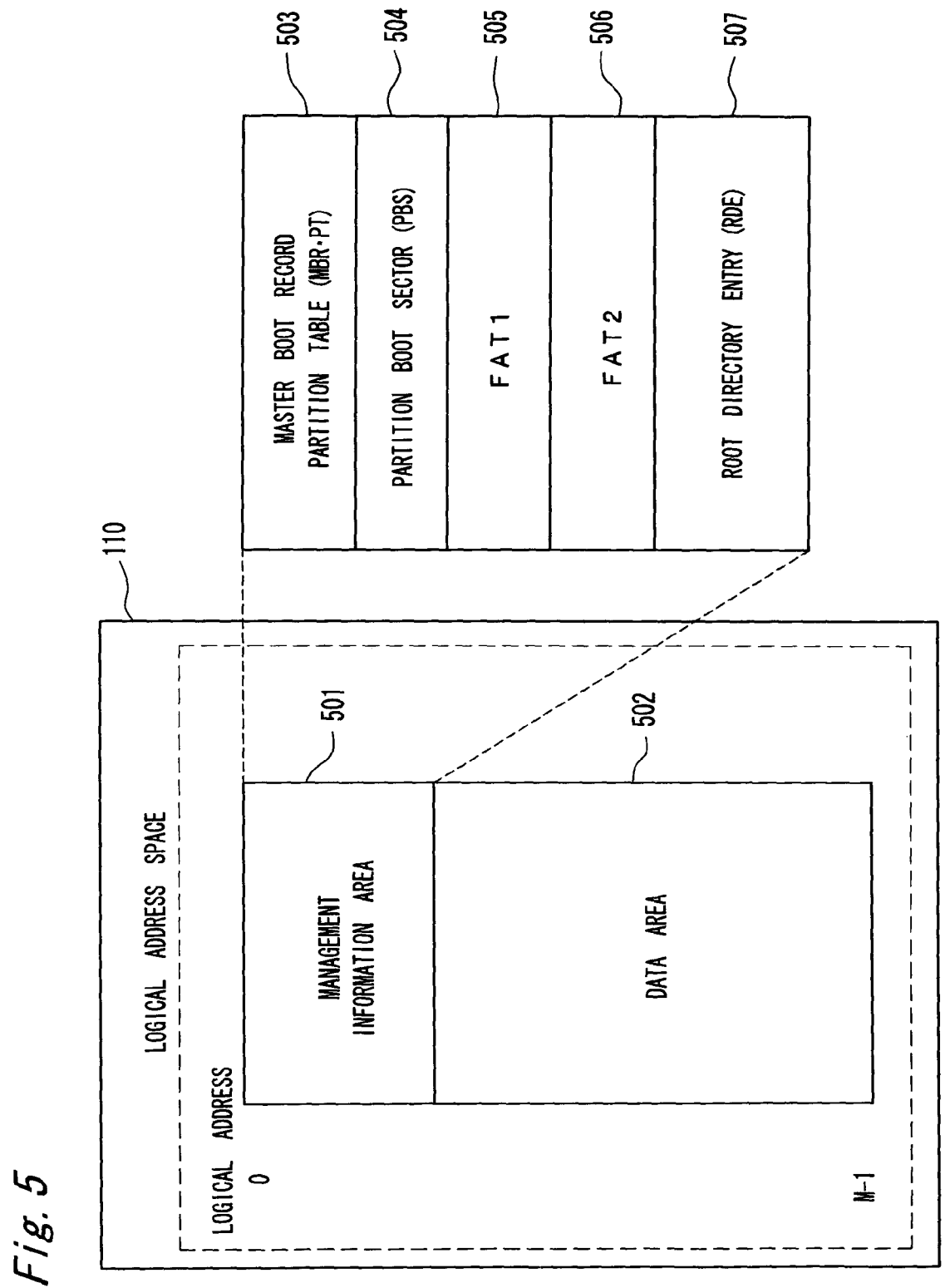
FIG. 5 is a block diagram of FAT file system.

FIG. 5 is a block diagram of the FAT file system. The file system is constructed in the logical address space in the semiconductor memory card 110. In the FAT file system, a management information area 501 for storing management information on entire area to be managed by the FAT file system is present at the beginning of the logical address space, which is succeeded by a data area 502 for storing data in the file. The management information area 501 is composed of master boot record partition table 503, partition boot sector 504, FATs 505 and 506, and root directory entry 507.

The master boot record partition table 503 is what stores information for managing the file system management area while the file system management area is divided into plural areas which are called "partitions". The partition boot sector 504 is what stores the management information in one partition. The FATs 505 and 506 are what show physical storage position of data contained in the file. The root directory entry 507 is what stores information of file and directory recorded immediately beneath the root directory. Since the FATs 505 and 506 are important areas showing physical storage position of data included in the file, the FAT is usually duplicated so that the management information area 501 has two FATs 505 and 506 having the same information.

The data area 502 is managed while divided into plural clusters each of which holds data contained in a file. A file, or so, including large amount of data holds data over plural clusters, where a link among the clusters is managed by link information stored in the FATs 505 and 506.

Figure 6:
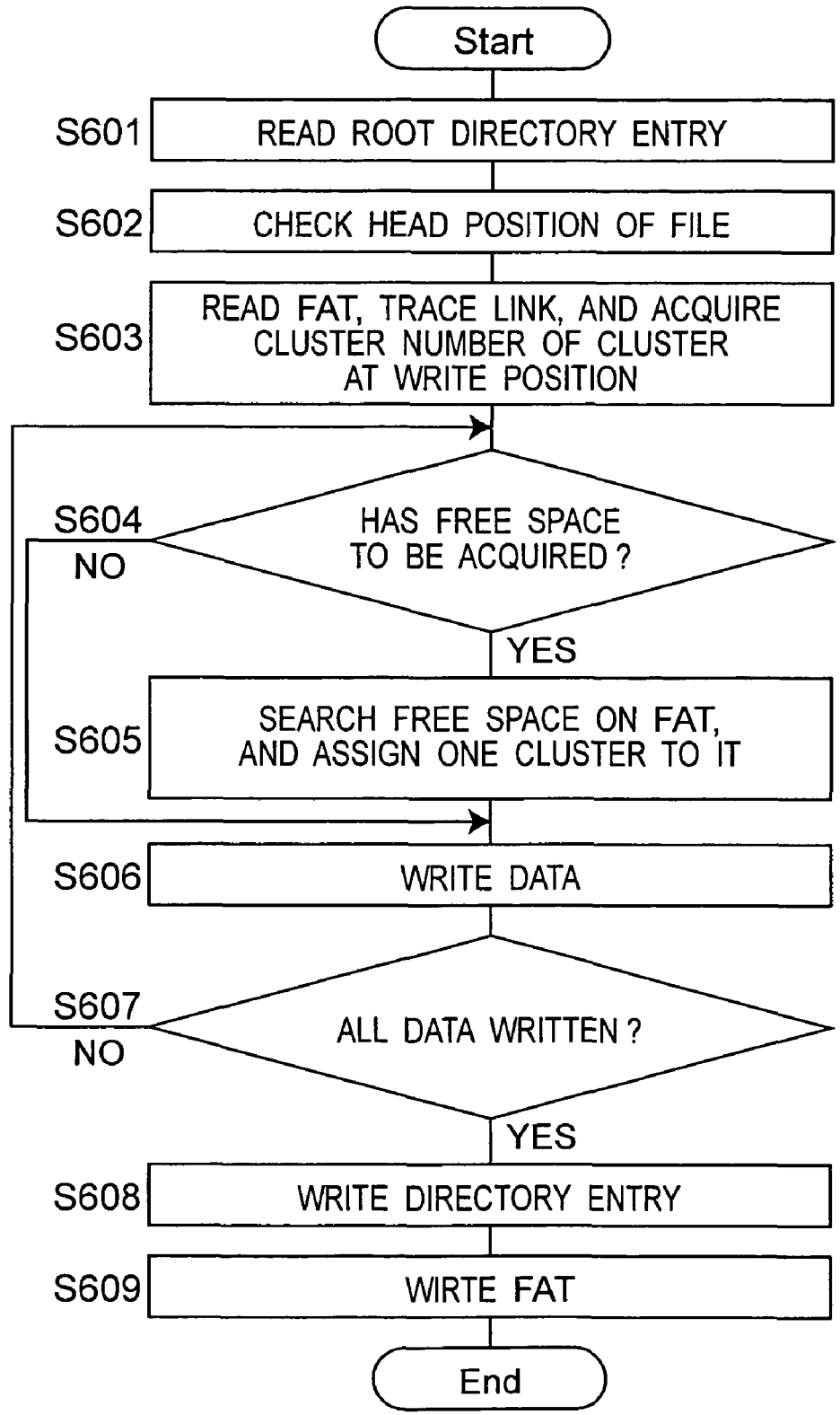
FIG. 6 is a flowchart of writing process of data according to FAT file system.

Referring next to FIG. 6, FIGS. 7A to 7C, and FIGS. 8A to 8C, examples of writing of file data according to the FAT file system are explained. FIG. 6 is a flowchart of a write process of data according to FAT file system, and FIGS. 7A to 7C and FIGS. 8A to 8C show examples of directory entry 701, FATs 505 and 506, and data area 502 before and after the writing process.

Figure 7A:
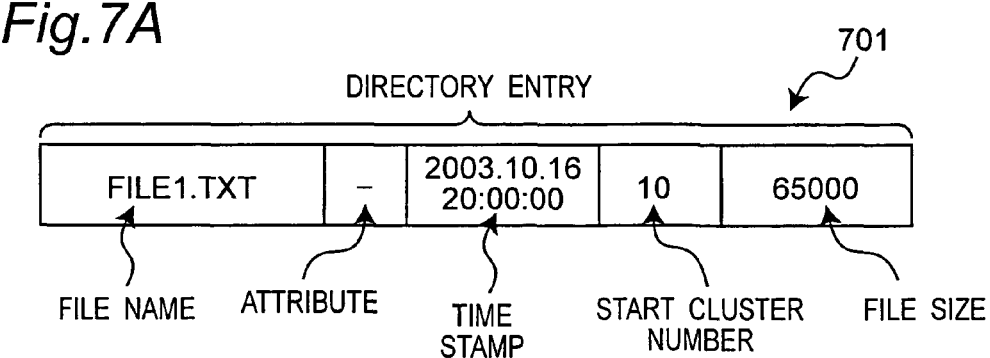
FIG. 7A is an explanatory diagram of state of directory entry before data writing with FAT file system.
Figure 7B:
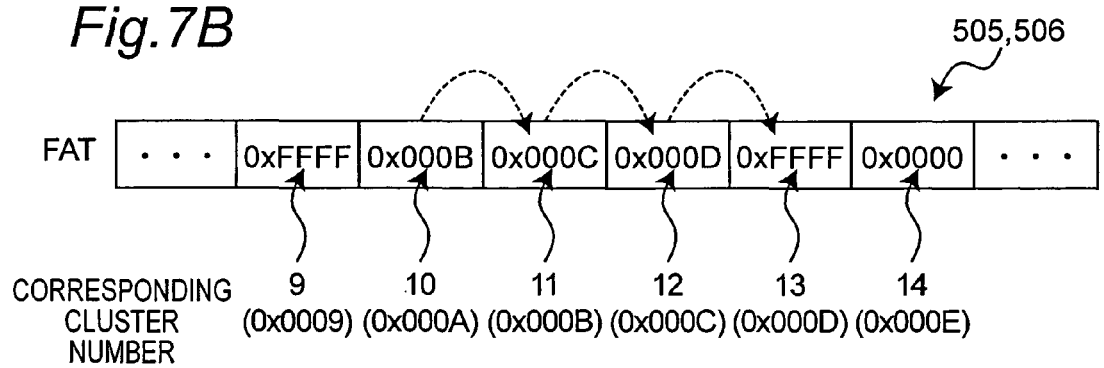
FIG. 7B is an explanatory diagram of state of FAT before data writing with FAT file system.

In the FAT file system, the directory entry 701 carrying information of file name, file size, file attribute and others is stored in part of the root directory entry 507 or data area 502. FIG. 7A shows an example of the directory entry 701, and FIG. 7B shows the corresponding portion of FAT to the directory entry 701. The directory entry 701 includes file name, attribute, time stamp, start cluster number, and file size. The directory entry shown in FIG. 7A holds information about a file of which file name is "FILE1.TXT,". The beginning portion of data contained in that file is stored in the cluster of cluster number "10", and the file size is 65,000 bytes. In FIG. 7A, the size of one cluster is assumed to be 16,384 bytes. In FIG. 7B, "0xFFFF" indicates end of data. It is known from FIG. 7B that the data of "FILE1.TXT" is recorded over four clusters.

Referring to FIG. 6, the write process of file data is explained. In the write process of file data, first of all, the directory entry 701 of a write target file is read (S601). The start cluster number stored in the read directory entry 701 is acquired, and the beginning position of the file data is confirmed (S602). Next, the FATs 505 and 506 are read. The link is traced on the FATs 505 and 506 sequentially from the beginning position of the acquired data file to acquire the cluster number of writing position (S603). Before writing data, it is judged if necessary or not to assign a free space newly in the file (S604). If necessary to assign a free space, free space is searched on the FATs 505, 506, and a free space for one cluster portion is assigned at the terminal end of the file (S605). If not necessary to assign a free space, the process goes to step S606.

Data is written as much as possible in the cluster in the data area 502 presently referring to (S606). It is judged if all data is written completely (S607). If data to be written is still left over, the process returns to S604. When all data is written completely, the file size and time stamp stored in the directory entry 701 are updated, and written to the semiconductor memory card 110 (S608). Finally, the FATs 505 and 506 are written to the semiconductor memory card 110, the process is terminated (S609).

Figure 7C:
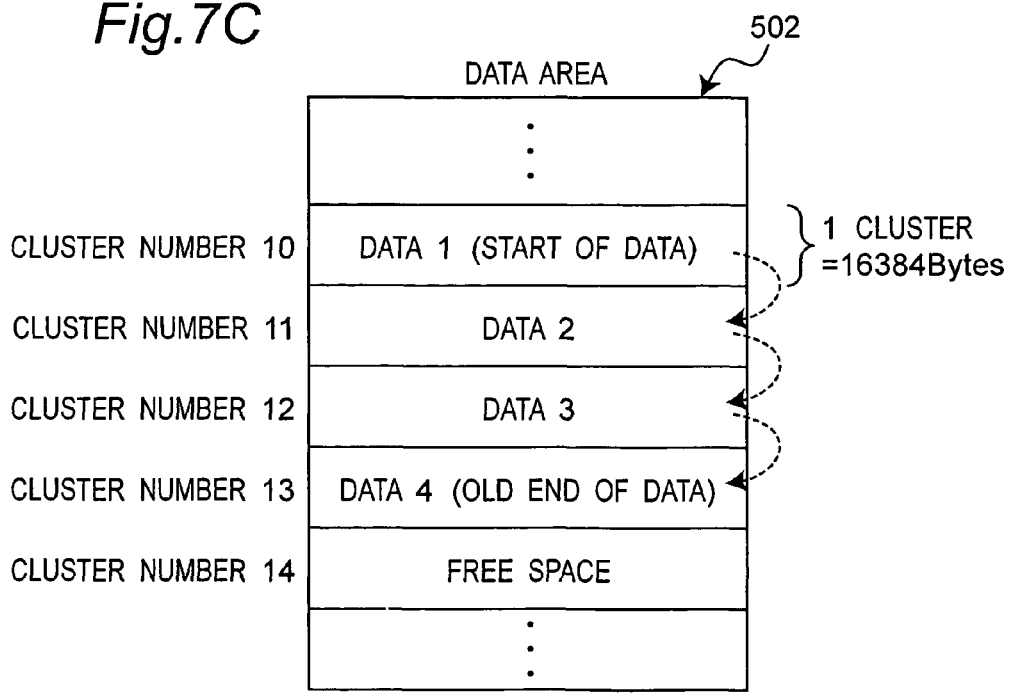
FIG. 7C is an explanatory diagram of state of data area before data writing with FAT file system.
Figure 8A:
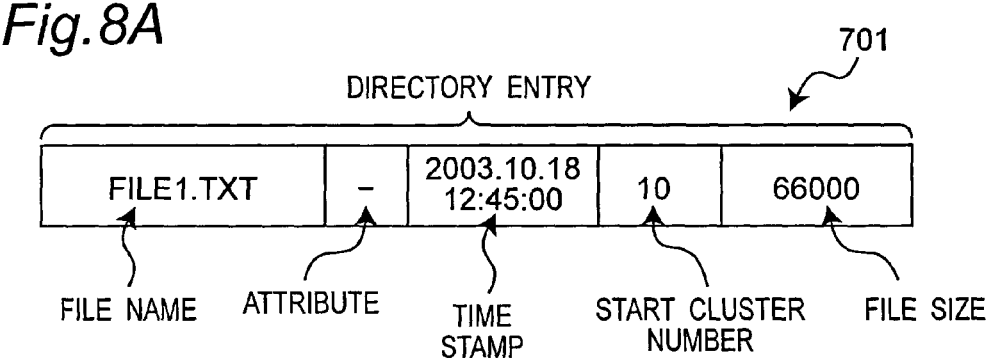
FIG. 8A is an explanatory diagram of state of directory entry after data writing with FAT file system.
Figure 8B:
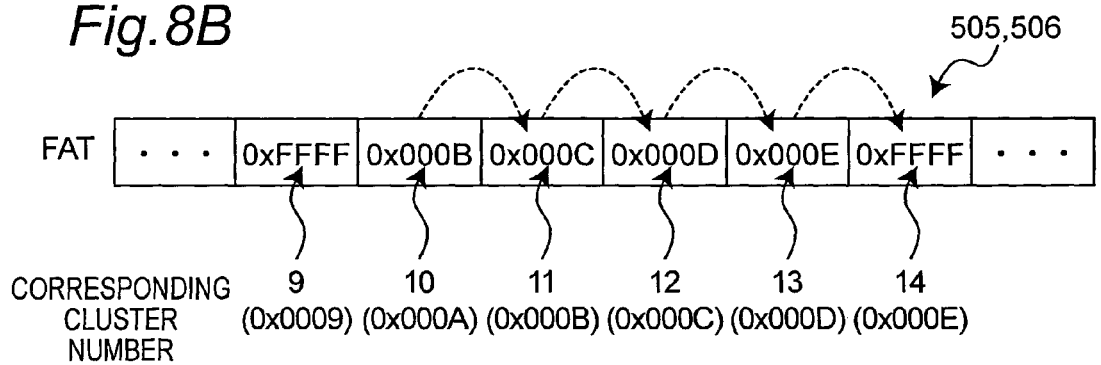
FIG. 8B is an explanatory diagram of state of FAT after data writing with FAT file system.
Figure 8C:
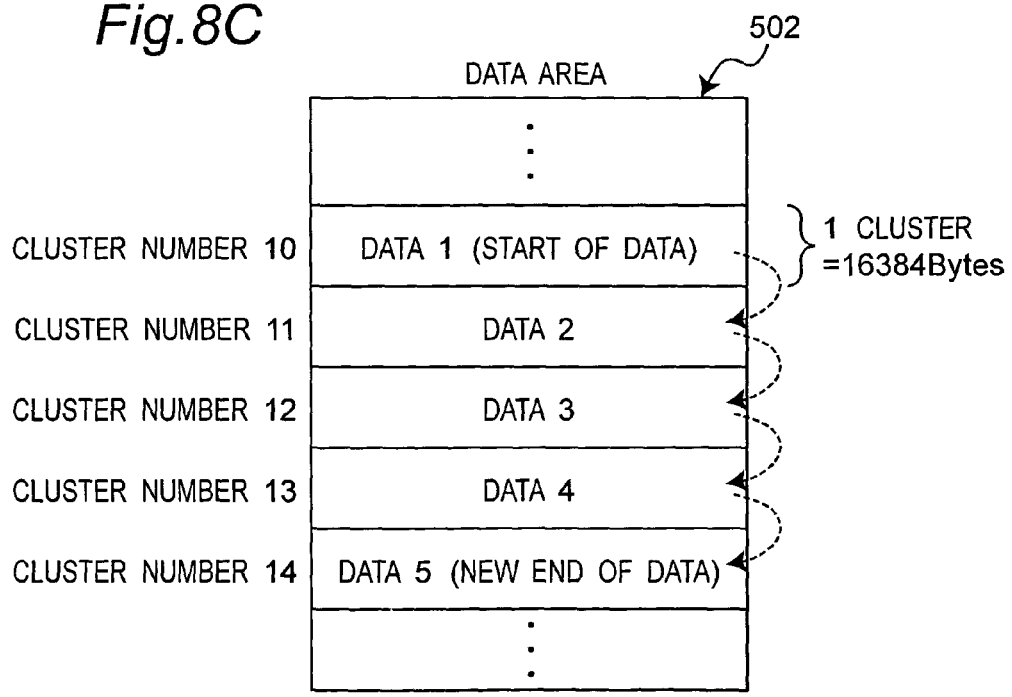
FIG. 8C is an explanatory diagram of state of data area after data writing with FAT file system.

With this file data writing process, when 1,000 bytes of additional data is written to "FILE1.TXT" having 65,000 bytes of data shown in FIGS. 7A to 7C, the file is changed to the file having 66,000 bytes of data shown in FIGS. 8A to 8C.

Thus, when writing file data to the semiconductor memory card 110 with the FAT file system, the file data is written in the data area 502, and the file system management information is also written. The file system management system includes the directory entry 701 containing information about files, and FATS 505 and 506 for area managing of data area 502. Since the file system management information must be recorded in the semiconductor memory card 110 every time the file data is updated, the area storing the file system management information is higher in frequency of updating than the area storing the file data.

While the file data is written to the semiconductor memory card 110 in a relatively large unit, the file system management information is written in smaller unit, about several bytes. On the other hand, the optimum writing unit of a flash memory used in the semiconductor memory card 110 tends to increase to tens of kB to hundreds of kB along with large capacity trend of a flash memory. When several bytes of data, such as file system management information, is written in a large access unit, such as tens of kB to hundreds of kB, dead area occurs, resulting in lowered access speed.

Accordingly, in the embodiment as shown in FIG. 1, the semiconductor memory card 110 includes the first semiconductor memory 118 for storing file system management information, the second semiconductor memory 119 for storing file data, and the address management information 123 for managing correspondence between recording area and logical address space in the first and second semiconductor memories 118 and 119. In this structure, the accessing apparatus 100 making access to the semiconductor memory card 110 specifies data type when writing data into the semiconductor memory card 110, and the semiconductor memory card 110 determines a position (destination) of data writing (first semiconductor memory 118 or second semiconductor memory 119) depending on the data type.

According to the structure, file data of large size can be stored in a semiconductor memory of which optimum access unit is relatively large, while file system management information of small size can be stored in a semiconductor memory of which optimum access unit is relatively small. As a result, dead area is not formed in the recording area in the semiconductor memory card 110, and high speed access to the semiconductor memory card 110 is realized. Further, file data with low frequency of updating can be stored in a semiconductor memory with short life, while file system management information with high frequency of updating can be stored in a semiconductor memory with long life, so that the life of the semiconductor memory card 110 can be extended.

(Operation of Semiconductor Memory Card and Accessing Apparatus)

Operation of the semiconductor memory card 110 and the accessing apparatus 100 of the embodiment is explained.

In this embodiment, when the accessing apparatus 100 writing to the semiconductor memory card 110, information indicating data type is specified by arguments of a write command. The format of the write command ("Write" command) is as follows.

Write (buf, size, addr, data_kind)
buf: buffer for storing write data
size: write size
addr: write address
data_kind: data type Arguments of "buf", "size", and "addr" are the same arguments as those of write command for the conventional semiconductor memory card.

Particularly, in the embodiment, it is characterized to provide the argument of "data_kind". The argument "data_kind" specifies either "file data" or "file system management information" as type of data to be passed to the write command. The data type is managed by the file system control function operating on the accessing apparatus 100, and is specified to the semiconductor memory card 110. In the embodiment, on the basis of the data type, the semiconductor memory card 110 determines a target semiconductor memory to which data is written.

(Data Write Process)

Figure 9:
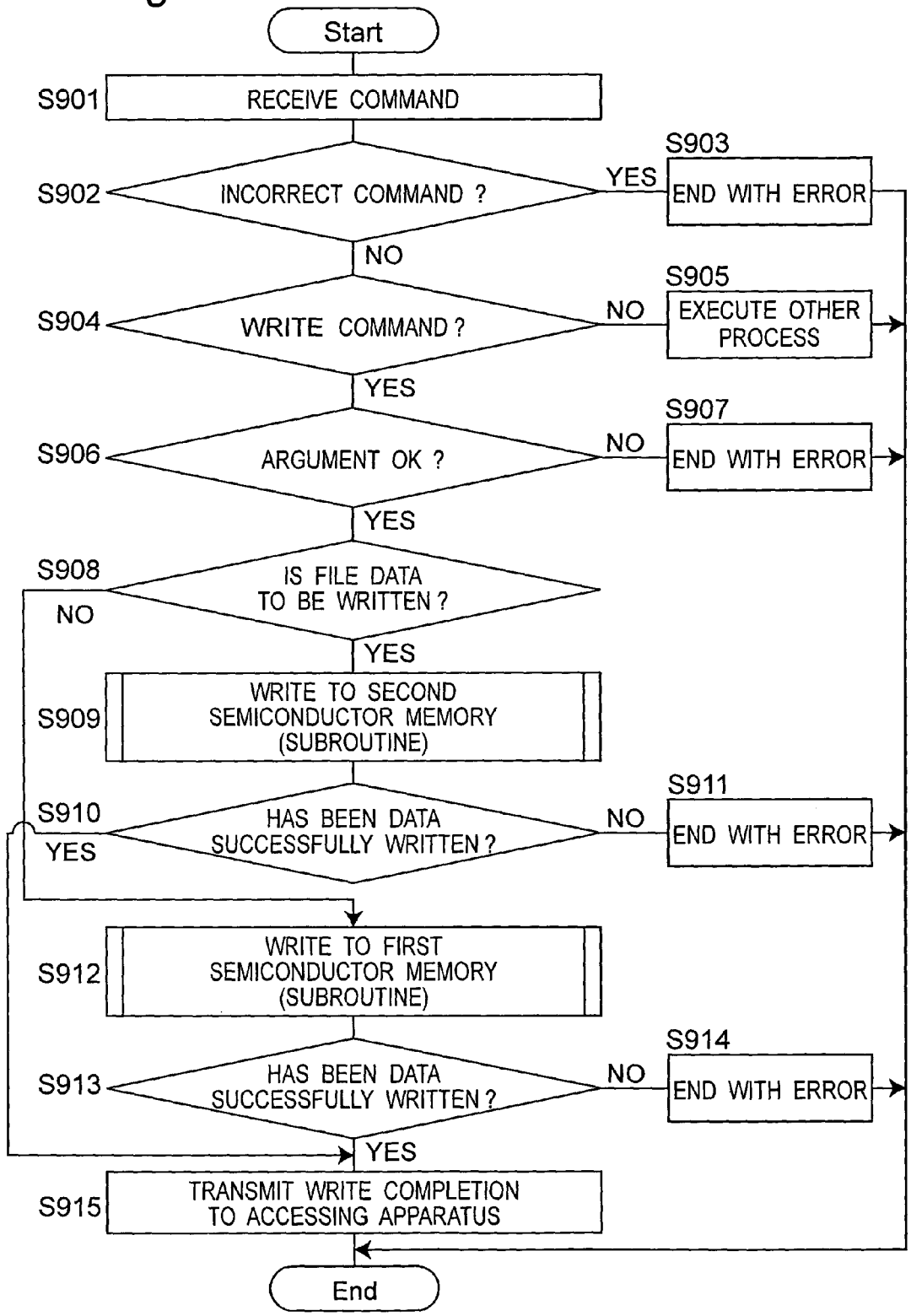
FIG. 9 is a flowchart of writing process in a semiconductor memory card in embodiment 1.

With reference to FIG. 9, data write process in the semiconductor memory card 110 in the embodiment is explained.

In FIG. 9, the semiconductor memory card 110 receives a command from the accessing apparatus 100 (S901). Referring to the received command, it is judged whether it is incorrect command that cannot be recognized by the semiconductor memory card 110 (S902). In the case of incorrect command, an error is noticed to the accessing apparatus 100 and the process is terminated (S903). In the case of a recognizable command, it is judged whether the received command is Write command (S904). In the case of command other than Write command, other process suited to the received command is executed (S905). In the case of Write command, the argument transferred together with the command is judged to be correct or not (S906). If it is judged that arguments not capable of being run to write process is specified, such as incorrect address is specified, an error is noticed to the accessing apparatus 100 and the process is terminated (S907).

When the argument is judged to be correct, referring to the argument "data_kind", the file type is judged to be "file data" or "file system management information" (S908).

When data_kind is "file data", data is written to the second semiconductor memory 119 (S909). Detail of this process is described later. In succession, it is judged whether the write process is successful (S910). In case of failure of the write process, an error is noticed to the accessing apparatus 100 and the process is terminated (S911). When the write process is successful, end of writing is noticed to the accessing apparatus 100 and the process is terminated (S915).

When data_kind is "file system management information", data is written into the first semiconductor memory 118 (S912). This process is nearly same as the process at step S909, and the detail is described later. In succession, it is judged whether the write process is successful (S913). In case of failure of the write process, an error is noticed to the accessing apparatus 100 and the process is terminated (S914). When the write process is successful, end of writing is noticed to the accessing apparatus 100 and the process is terminated (S915).

Figure 10:
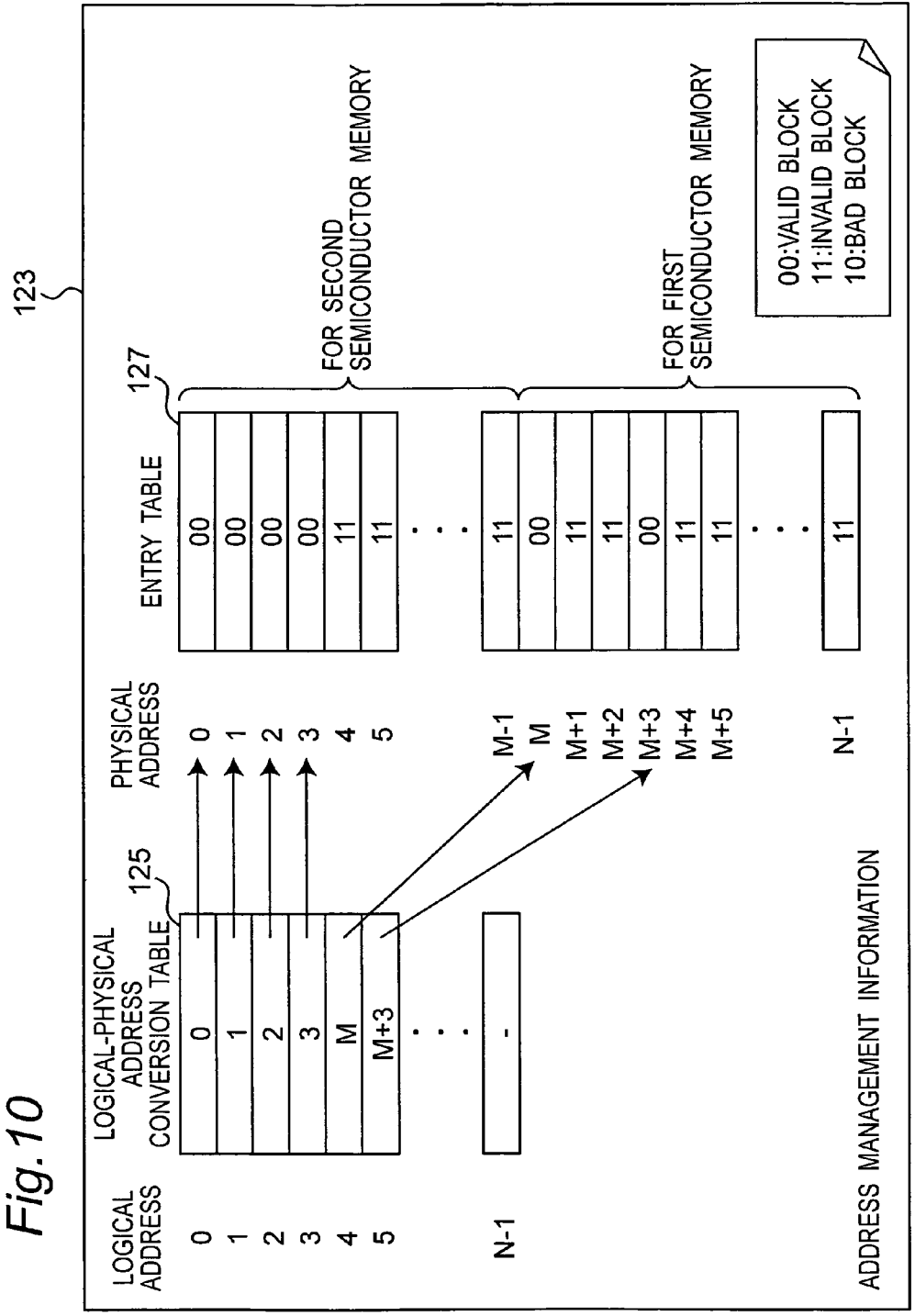
FIG. 10 is a diagram of example of address management information in embodiment 1.
Figure 11:
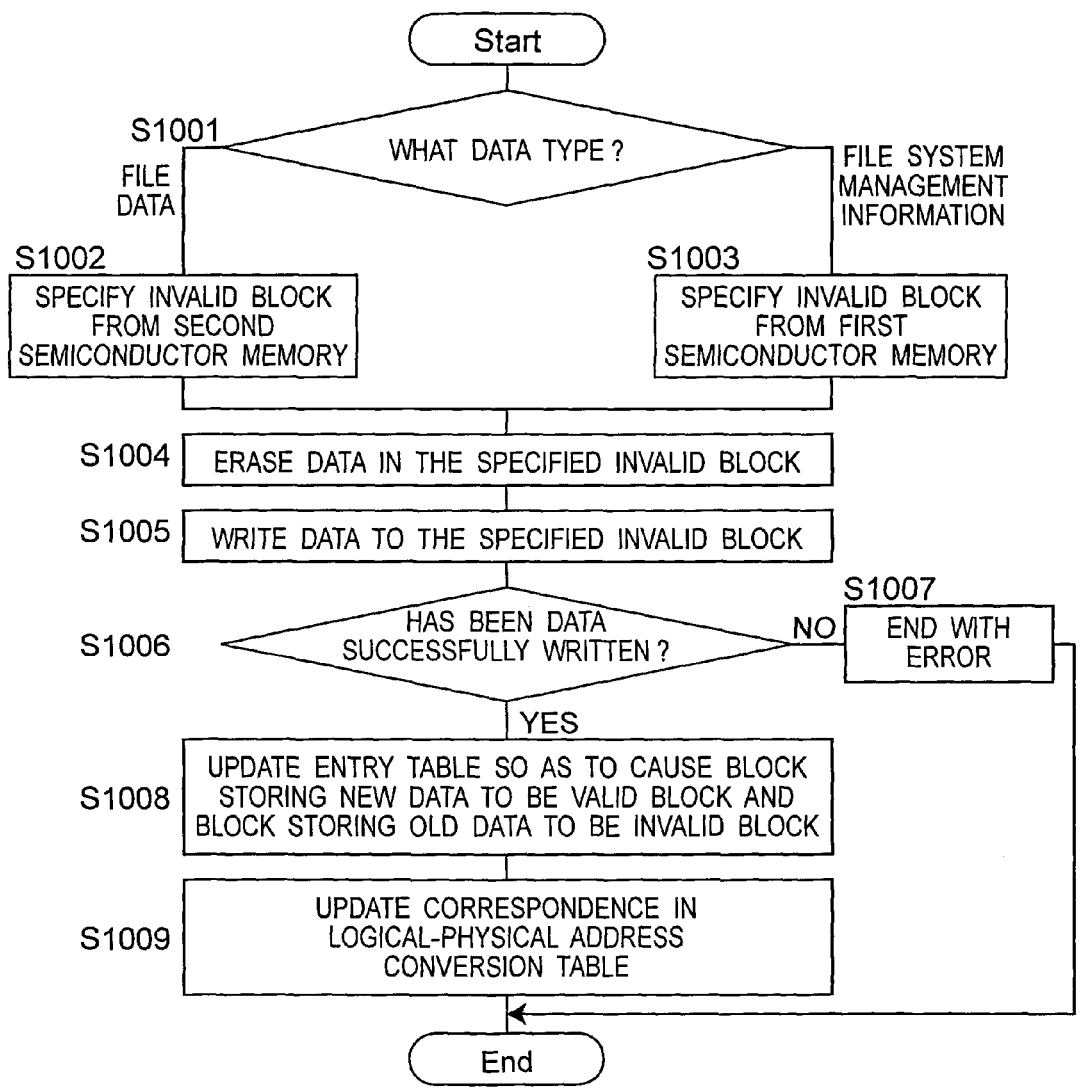
FIG. 11 is a flowchart of detail of writing process in a semiconductor memory in semiconductor memory card.

Referring now to FIGS. 10 and 11, the write process in the second semiconductor memory 119 and first semiconductor memory 118 at steps S909 and S912 is explained. First the address management information 123 is explained. FIG. 10 shows a structure of address management information 123 in the semiconductor memory card 110.

The address management information 123 includes a logical-physical address conversion table 125 showing relation between physical address pointing a physical position of a recording area (block) in the semiconductor memory card 110 and logical address pointing the logical position of a recording area (block) and used by the accessing apparatus 100, and an entry table 127 for managing usage state of each recording area (block). The unit (block) of a recording area with address assigned is an erase block in a flash memory.

The address management information 123 in FIG. 10 is located from logical address 0 to (N−1), and manages a total of N blocks. Logical addresses are assigned from 0 to (M−1) for the second semiconductor memory 119, and from M to (N−1) for the first semiconductor memory 118. That is, in the logical address space of N blocks, M blocks are present in the second semiconductor memory 119, and (N−M) blocks are present in the first semiconductor memory 118.

The logical-physical address conversion table 125 is composed of the same number of entries as the number of logical blocks existing in the semiconductor memory card 110, and each entry stores the physical address corresponding to the logical address. In the example in FIG. 10, an area from logical addresses 0 to 3 is related to an area from physical addresses 0 to 3 is assigned correspondingly, and further an area of logical addresses 4 and 5 is related to an area of physical addresses M and (M+3) is assigned, respectively.

The entry table 127 is composed of the same number of entries as the number of physical blocks existing in the semiconductor memory card 110. Each entry stores a flag showing usage state of a physical block. Regarding a value of the flag, "00" denotes a valid block, "11" denotes an invalid block, and "10" denotes a defective block. That is, areas with physical addresses 0 to 3, M and (M+3) is a valid block, and other areas are invalid blocks. The "valid block" is a block in which valid data is written, and the "invalid block" is a block in which valid data is not written.

FIG. 11 shows detail of process at steps S909 and S912 in FIG. 9. In FIG. 11, first, the data type is judged on the basis of argument of Write command (S1001). Depending on the data type, with reference to address management information 123 in the semiconductor memory card 110, a position for acquiring an invalid block is determined.

If the type of write data is "file data," an invalid block of data write position is designated from the second semiconductor memory 119 having the file data storage area 122 (S1002). For this purpose, referring to the address management information 123, one block is designated from the invalid blocks existing in the area with physical addresses 0 to (M−1).

On the other hand, if the type of write data is "file system management information," an invalid block of data write position is designated from the first semiconductor memory 118 having the file system management information storage area 121 (S1003). For this purpose, referring to the address management information 123, one block is designated from the invalid blocks existing in the area with physical addresses M to (N−1).

Next, prior to writing of data, data existing in the designated invalid block is erased (S1004), and data is written to this invalid block (S1005). It is then judged if writing is successful (S1006).

In case of writing failure, the process ends with an error (S1007). When writing is successful, the entry table 127 is updated to render the block storing new data to be "valid block (00)" and the block storing the former data to be "invalid block (11)" (S1008). It is noted that the "former data" means data that is stored in a valid block when the block of physical address corresponding to the logical address designated by Write command is valid block.

Finally, the logical-physical address conversion table 125 is updated so that the physical address storing the new data corresponds to the logical address to be written (address specified by the argument of Write command) (S1007).

In FIG. 11, if the block size is different between the first and second semiconductor memories 118 and 119, the address is managed in a smaller block size on the logical-physical address conversion table 125. When storing data in a semiconductor memory of large block size, the address is managed so that consecutive areas are provided on the logical-physical address conversion table 125. According to this management, the method of the embodiment can be applied similarly.

As explained herein, in the embodiment, the accessing apparatus 100 transmits data to the semiconductor memory card 110 when writing data, while specifying either one of "file data" and "file system management information" as data type. The semiconductor memory card 110 stores data in the second semiconductor memory 119 with large access unit and short updating life when the data type is "file data", while stores in the first semiconductor memory 118 with small access unit and long updating life when the data type is "file system management information". Thus, high speed access in the semiconductor memory card 110 is realized, and the life can be extended.

This embodiment has a feature in that the data type is specified on writing by the accessing apparatus 100 and that the write position is determined in the semiconductor memory card 110. The writing process explained in FIG. 11 is shown only as an example.

That is, when the semiconductor memory not requiring erase process prior to data writing is used, the erase process may be omitted. Erase timing is not limited to immediately before data writing, but may be immediately after data writing, or data may be erased in batch at arbitrary timing.

As for the address management information, the explanation is made for the case that the number of logical blocks is equal to the number of physical blocks. However, the concept of the invention can be similarly applied to a semiconductor memory card having a greater number of physical blocks for the purpose of providing alternative area.

The address management information 123 may be included in the first semiconductor memory 118 and second semiconductor memory 119, and the third semiconductor memory 120 may be omitted.

The first and second semiconductor memories may be also realized by any nonvolatile memories, such as flash ROM, EEPROM, FeROM, MRAM (Magneto resistive RAM), and others, as long as at least one of optimum access unit and life is different.

In the embodiment, although the FAT file system is shown as an example of a file system, the same effects are obtained by other file systems such as UDF file system, and NTFS file system.

Embodiment 2

The semiconductor memory card in embodiment 1 has two semiconductor memories having different optimum access units, and stores file data and file system management information in the respective semiconductor memories. By contrast, the semiconductor memory card of this embodiment has one semiconductor memory having two divided recording areas with the areas having different access units (management methods). File data and file system management information are stored in the respective areas. In this structure, too, high speed access same as in embodiment 1 is realized.

(Structure of Semiconductor Memory Card and Accessing Apparatus)

Figure 12:
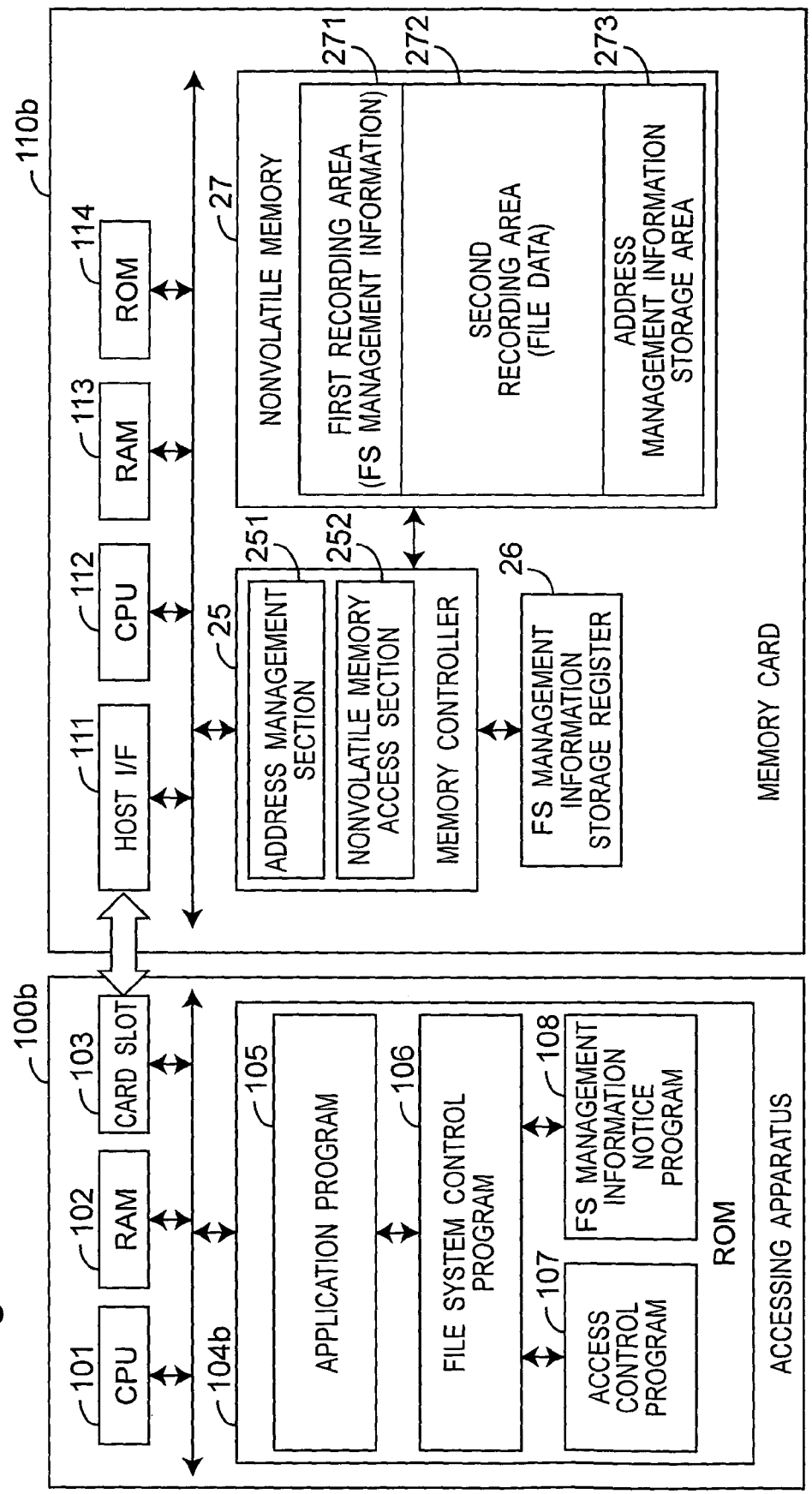
FIG. 12 is a block diagram of a semiconductor memory card and an accessing apparatus in embodiment 2 of the invention.

FIG. 12 shows structure of a semiconductor memory card and an accessing apparatus of the present embodiment. As shown in FIG. 12, the same component elements as in FIG. 1 operate same as in embodiment 1, and realize the same functions.

An accessing apparatus 100b includes a CPU 101, a RAM 102, a card slot 103, and a ROM 104b. The ROM 104b stores application program 105, file system control program 106, access control program 107, and FS management information notice program 108.

The FS management information notice program 108 presents FS management information notice function (FS management information notice means) for informing the semiconductor memory card 110b of information about position or size of file system management information. Hence, the semiconductor memory card 110b preliminarily knows the position or size of the file system management information. When an access instruction is issued from the accessing apparatus 100b by access command, the semiconductor memory card 110b can judge the data type on the basis of the address, and change internal processing in itself depending on the data type.

As shown in FIG. 12, the semiconductor memory card 110b includes a host interface (I/F) 111, a CPU 112, a RAM 113, a ROM 114, a memory controller 25, a FS management information storage register 26, and a nonvolatile memory 27.

The FS management information storage register 26 is means for storing information about position or size of the file system management information noticed by the FS management information notice function of the accessing apparatus 100b.

The nonvolatile memory 27 includes a first recording area 271 for storing mainly the file system management information, a second recording area 272 for storing file data, and an address management information storage area 273 for storing address management information. The first recording area 271 and second recording area 272 differ in data management method (data management unit) (The detail is described later.).

The memory controller 25 includes an address management section 251 for managing the address of recording area on the basis of address management information stored in the nonvolatile memory 27, and a nonvolatile memory access section 252 for controlling access to the nonvolatile memory 27.

In this embodiment, position or size of file system management information is preliminarily noticed from the accessing apparatus 100b to the semiconductor memory card 110b. When access instruction to the semiconductor memory card 110b is issued from the accessing apparatus 100b by access command, the data type is judged, and data write process in the semiconductor memory card is changed depending on the data type. Hence, lowering of access speed is prevented.

(Internal Structure of Nonvolatile Memory)

Figure 13:
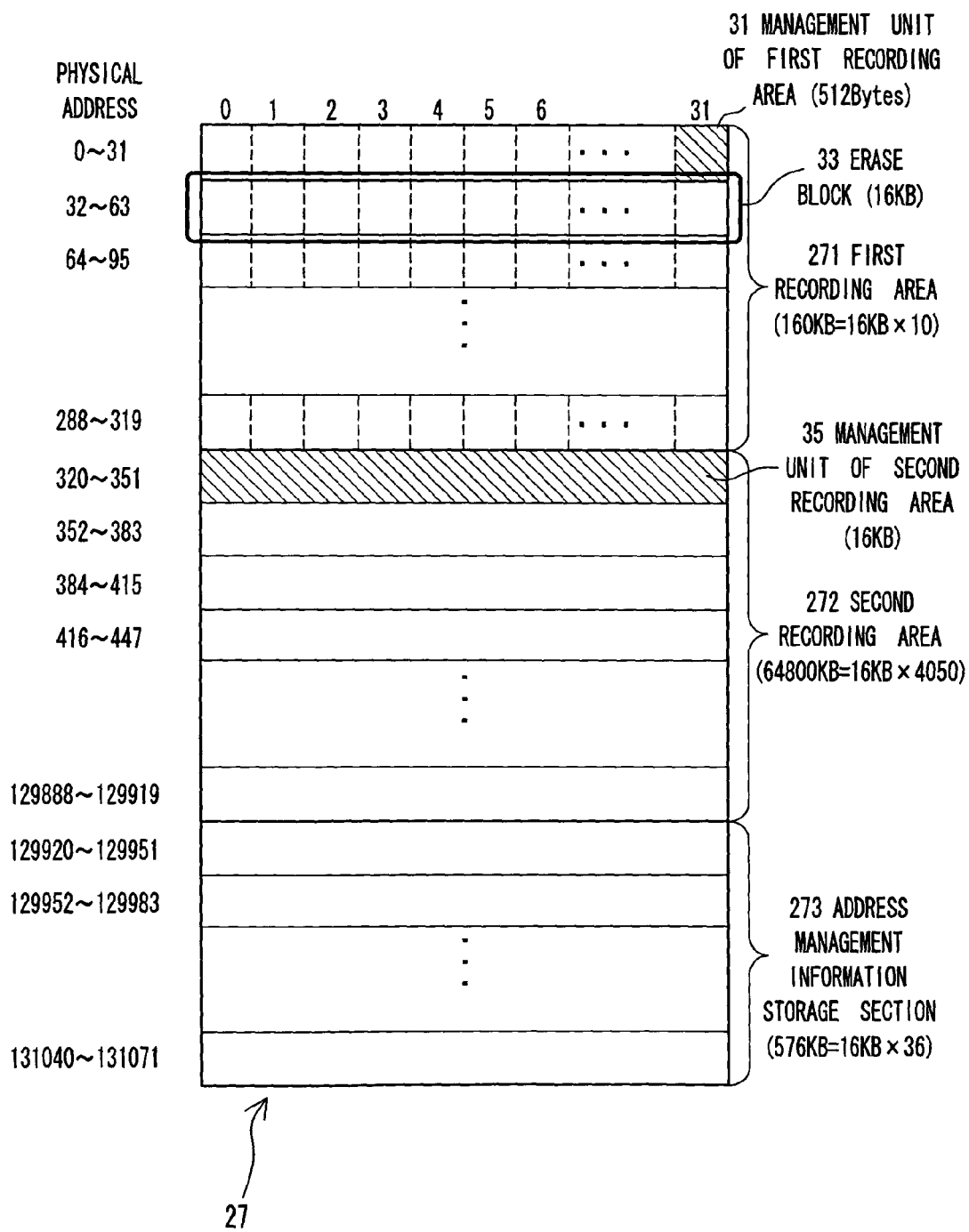
FIG. 13 is a diagram of example of address space of a nonvolatile memory in a semiconductor memory card in embodiment 2.

FIG. 13 shows an example of an address space of the nonvolatile memory 27 in the semiconductor memory card 110b of the present embodiment. As shown in the drawing, the nonvolatile memory 27 includes a first recording area 271 for managing access of data in a relatively small unit of 512 bytes, a second recording area 272 for managing access of data in a relatively large unit of 16 kB, and an address management information storage area 273 for storing address management information. In this example, the first recording area 271 has 160 kB of size, the second recording area 272 has 64800 kB of size, and the address management information storage area 273 has 576 kB of size.

The nonvolatile memory 27 has characteristic in that, for overwriting, data must be erased in erase block unit prior to data writing, and includes replacement areas which are replaced when a part of a erase block is physically destroyed leading to disabled recording. The size of erase block is 16 kB.

The first recording area 271 and second recording area 272 are mutually different in management method. In the first recording area 271, data read/write operation is conducted in a unit of 512 bytes (=1 sector), while in the second recording area 272, data read/write operation is conducted in a unit of 16 kB (=32 sectors=1 erase block) That is, the first recording area 271 is suited to write operation for data with a size of 16 kB or smaller, and the second recording area 272 is suited to write operation for data with a size of 16 kB or larger.

The semiconductor memory card 110b judges the type of write data on the basis of information about position or size of file system management information preliminarily acquired from the accessing apparatus 100b, and records data to the first recording area 271 when the write data is file system management information, and records data to the second recording area 272 when the write data is file data.

(Access Management Information)

FIG. 14 is a diagram of example of address management information in the semiconductor memory card 110b in the embodiment. The address management information includes a logical-physical address conversion table 51 for converting the logical address recognized by the accessing apparatus 100*b* and the physical address representing the physical address space on the nonvolatile memory 27 in the semiconductor memory card 110*b*, and a link table 53 for indicating state of each physical area on the nonvolatile memory 27.

The logical-physical address conversion table 51 is a table including elements in the same number as the total number of addresses existing in the logical address space, and each element stores the value of a corresponding physical address. In FIG. 14, the state that the physical address is not assigned to the logical address is denoted by "–". In the example in FIG. 14, areas from address 0 to address 127 in the logical address space are assigned to areas from address 320 to address 447 in the physical address space respectively, and the other areas are not assigned.

The link table 53 is divided into a portion for first recording area and a portion for second recording area, and managed separately. In the example in FIG. 14, the area from address 0 to address 319 of physical address space is the portion for the first recording area, and the area following address 320 is the portion for the second recording area. In the link table 53, "00" denotes a valid block already assigned to logical address and used for data storage. "11" denotes an erased block not assigned to logical address and usable for data storage. "10" denotes an invalid block not assigned to logical address, not erased. The invalid block is turned to be available for data storage after erasure.

Regarding the accessing apparatus 100*b* and semiconductor memory card 110*b* having such structure, the operation is explained below.

(Operation of Accessing Apparatus)

Figure 15:
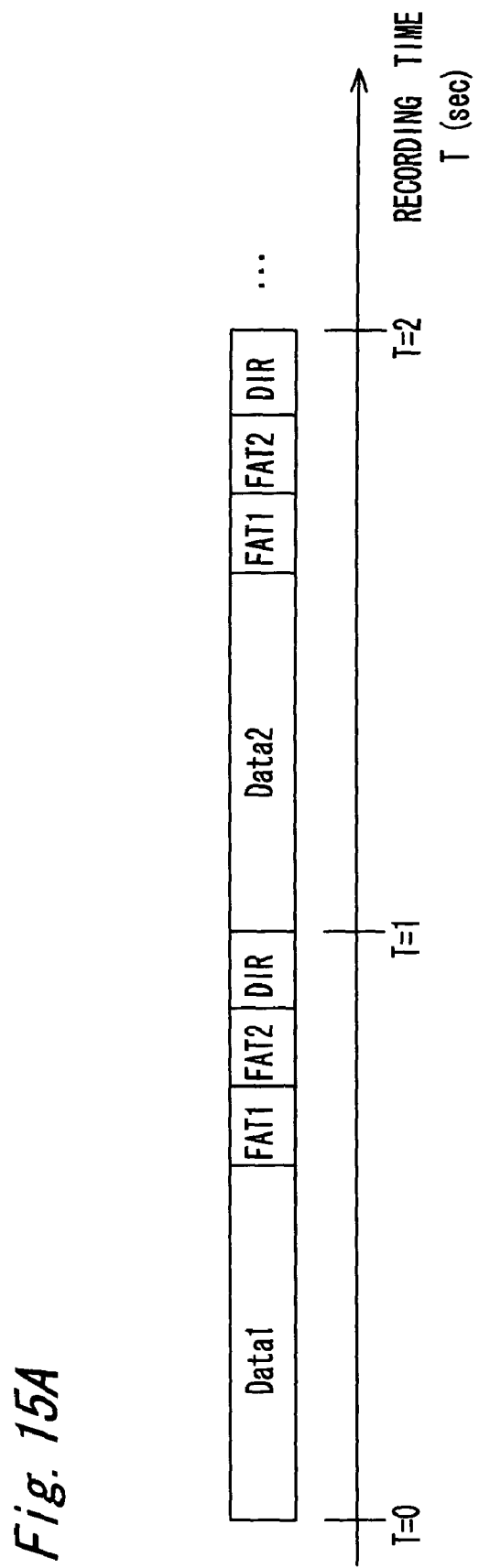
FIG. 15A is a diagram of example of sequence of data writing in a semiconductor memory card.
FIG. 15B is a diagram of command sequence issued by accessing apparatus 100b to the data sequence shown in FIG. 15A.

Write operation of the accessing apparatus 100*b* is explained. When recording file data in the semiconductor memory card 110*b*, in addition to the file data, file system management information must be recorded, such as area assignment state in the semiconductor memory card 110*b*, file name, and file size. For FAT file system, file system management information corresponds to FAT 1, FAT 2, and directory entry. That is, in the case of FAT file system, as shown in FIG. 15A, data, FAT 1, FAT 2, and directory entry (DIR) are recorded in the semiconductor memory card 110*b* in this sequence, and this operation is repeated in specific period. As a result, entire file data is recorded.

FIG. 15B is a diagram of command sequence issued by the accessing apparatus 100*b* to data sequence in FIG. 15A. As shown in the command sequence in FIG. 15B, in this embodiment, before issuing the write command to the semiconductor memory card 110*b*, "SetFSInfoAddr" command for specifying position or size of the file system management information is issued. This "SetFSInfoAddr" command is explained below.

The "SetFSInfoAddr" command is a command for setting the position (logical address) and size of the file system management information in the nonvolatile memory 27 of the semiconductor memory card 110*b*. This command allows the semiconductor memory card 110*b* to recognize the area for storing the file system management information. Its format is as follows.

SetFSInfoAddr (addr, size)
addr: start position (logical address)
size: size (number of sectors)

In the example in FIG. 15B, the first three commands set an area of one sector from address 32 in the logical address space as an area for FAT 1, an area of one sector from address 34 in the logical address space as an area for FAT 2, and an area of one sector from address 64 in the logical address space as an area for directory entry. Thus, the accessing apparatus 100*b* issues SetFSInfoAddr command prior to data writing to set the position of the file system management information preliminarily. The SetFSInfoAddr command may be issued only once, when the semiconductor memory card 110*b* is loaded into the accessing apparatus 100*b*, or when power is supplied to the accessing apparatus 100*b*. It is not needed to issue that command every time the data writing is processed.

<SetFSInfoAddr Command Process>

Figure 16:
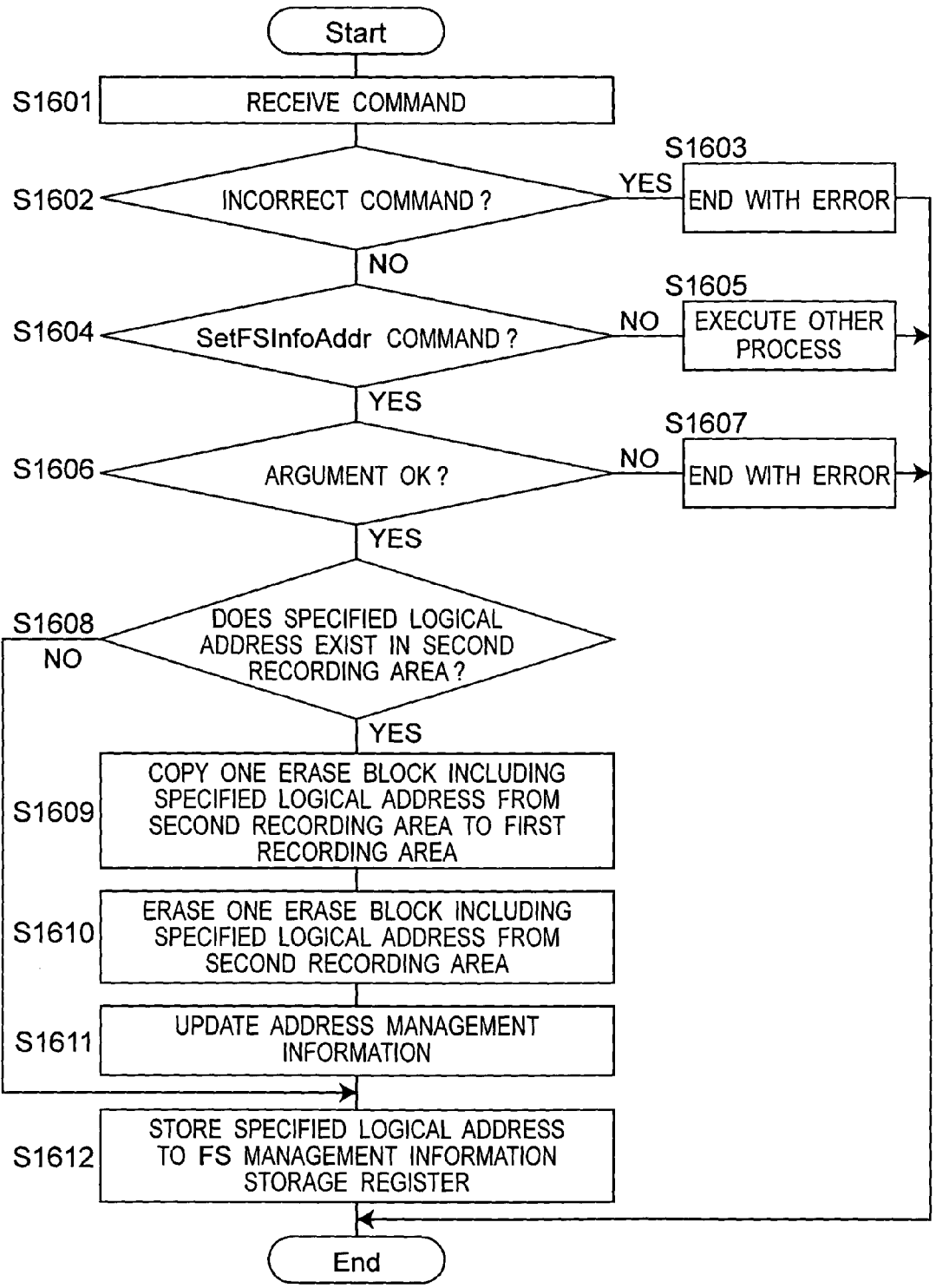
FIG. 16 is a flowchart of processing SetFSInfoAddr command in a semiconductor memory card.

With reference to FIG. 16, the procedure of SetFSInfoAddr command in semiconductor memory card 110*b* is explained below.

The semiconductor memory card 110*b* receives the command issued by the FS management information notice function of the accessing apparatus 100*b* (S1601), refers to the received command, and judges if the received command is incorrect command that cannot be recognized by the memory card 110*b* (S1602). If incorrect command, an error is noticed to the accessing apparatus (S1603), and the process is terminated.

If not incorrect command, the received command is judged to be SetFSInfoAddr command or not (S1604). If not SetFSInfoAddr command, the process corresponding to the received command is executed (S1605), and the process is terminated.

If SetFSInfoAddr command, it is judged if the argument transferred together with the command is correct (S1606). The argument of SetFSInfoAddr command includes "addr" indicating the logical address storing the file system management information, and "size" indicating the size of the file system management information. If incorrect address is specified in addr, or the argument is judged to be wrong, an error is noticed to the accessing apparatus (S1607), and the process is terminated.

When the argument is judged to be correct, it is judged if the logical address specified by addr exists in the second recording area 272 or not (S1608).

If not exist in the second recording area 272, the specified logical address and size are stored in the FS management information storage register 26 (S1612), and the process is terminated.

If it exists in the second recording area 272, a free space for one erase block is kept in the first recording area 271, and data of one erase block including the specified logical address is copied to the free space obtained from the second area 272 (S1609).

Data of one erase block including the specified logical address is erased from the second recording area 272 (S1610). Address management information is updated (S1611). The specified logical address and size are stored in the FS management information storage register 26 (S1612), and the process is terminated.

<Write Command Process>

Figure 17:
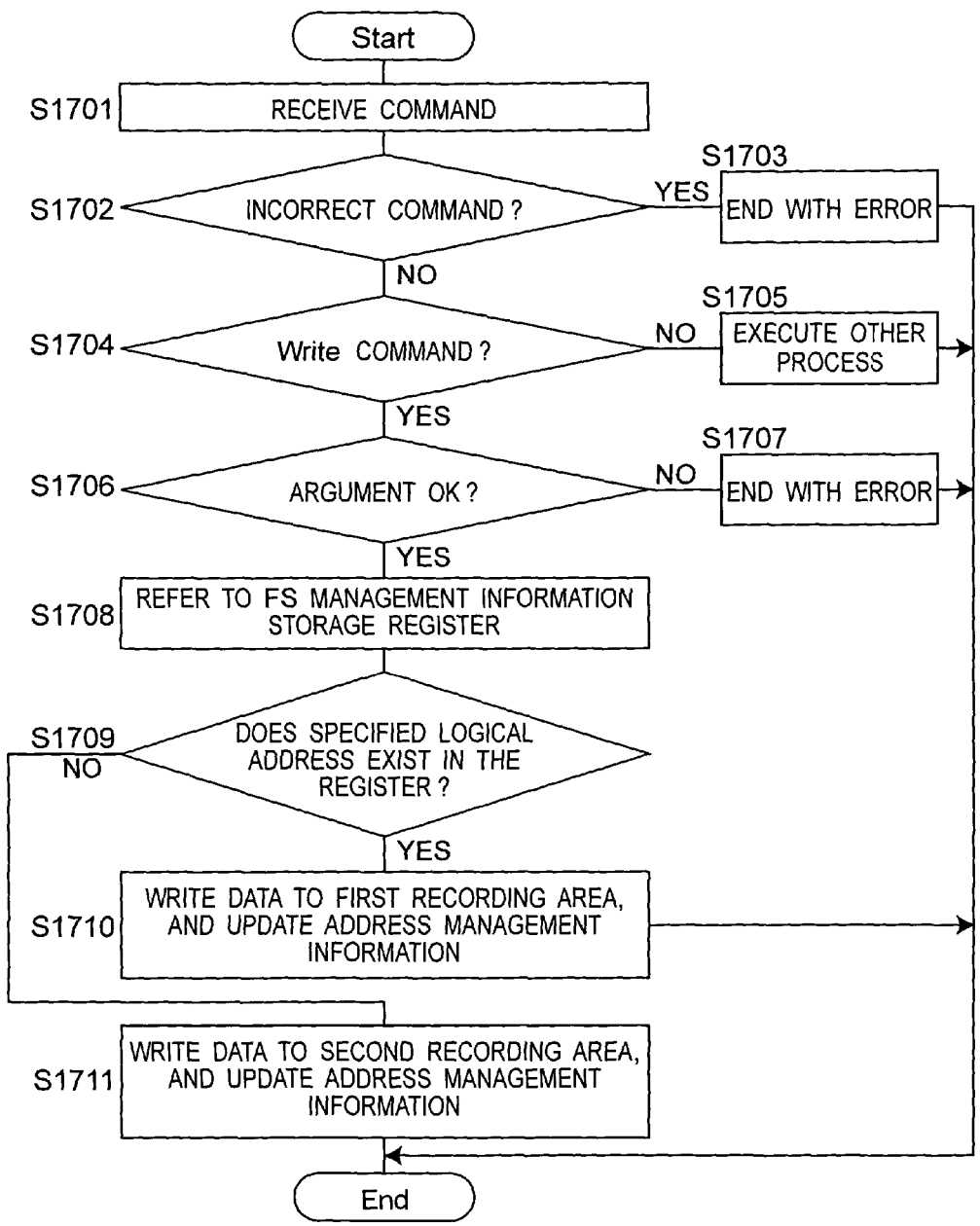
FIG. 17 is a flowchart of processing procedure of Write command in a semiconductor memory card.

With reference to FIG. 17, a procedure of Write command in the semiconductor memory card 110*b* is explained.

The semiconductor memory card 110*b* receives the command issued by the access control function of the accessing apparatus 100*b* (S1701), refers to the received command, and judges if it is an incorrect command that cannot be recognized by the memory card 110*b* (S1702). If incorrect command, an error is noticed to the accessing apparatus (S1703), and the process is terminated.

If not incorrect command, the received command is judged to be Write command or not (S1704). If not Write command, the process corresponding to the received command is executed (S1705), and the process is terminated.

If Write command, it is judged if the argument transferred together with the command is correct (S1706) The argument of Write command includes "addr" indicating the logical address of the data write position, and "size" indicating the size of the data. If incorrect address is specified in addr, or argument is judged to be wrong, an error is noticed to the accessing apparatus (S1707), and the process is terminated.

When the argument is judged to be correct, information is obtained about position (address) or size of the file system management information stored in the FS management information storage register 26 (S1708).

Referring to the information acquired from the FS management information storage register 26, it is judged if the logical address specified by argument addr is the address stored in the FS management information storage register 26 (S1709).

If the logical address specified by the argument addr is the address stored in the FS management information storage register 26, the write data is judged to be file system management information. In this case, data write process in the first recording area 271 is executed, and the address management information (logical-physical address conversion table 51, link table 53) is updated (S1710), and the process is terminated.

On the other hand, if the logical address specified by the argument addr is not stored in the FS management information storage register 26, the write data is judged to be file data. In this case, data write process in the second recording area 272 is executed, and the address management information (logical-physical address conversion table 51, link table 53) is updated (S1711), and the process is terminated.

Thus, in the embodiment, using SetFSInfoAddr command, the accessing apparatus 100b informs the semiconductor memory card 110b about information on storage position and size of the file system management information. Afterward, using Write command, file system management information and file data are written into the semiconductor memory card 110b. As a result, when Write command is issued, the write data type can be judged on the basis of the logical address specified by the argument in the semiconductor memory card 110b, and hence a writing method can be changed according to the data type, so that both file system management information and file data can be written at high speed.

(Specific Example of Updating of Address Management Information)

The following is a specific explanation about updating of the address management information (logical-physical address conversion table 51, link table 53) accompanying the recording of file data. In the following explanation, updating of address management information is explained, when the accessing apparatus 100b records file data in the semiconductor memory card 110b on the basis of the command sequence shown in FIG. 15B with the state of the address management information shown in FIG. 14 as initial state.

<Seq. 1 to 3: Setting of File System Management Information Storage Area>

The first three SetFSInfoAddr commands in FIG. 15B set the storage position (area) of the file system management information of nonvolatile memory 27 (FAT 1, FAT 2, directory entry (DIR)). The argument of SetFSInfoAddr command specifies address 32, address 34, and address 64 in the logical address spaces for logical addresses of FAT 1, FAT 2, directory entry (DIR), respectively.

Referring to the logical-physical address conversion table 51 in FIG. 14, physical addresses (address 352, address 354, and address 384) have been already assigned to the specified three logical addresses (address 32, address 34, and address 64). Referring to the link table 53, these physical addresses exist respectively in the second recording area 272 for storing such file data. Herein, data of one erase block including each one of three physical addresses (address 352, address 354, and address 384) is copied from the second recording area 272 for storing the file data into the first recording area 271 for storing the file system management information.

As known from FIG. 14, one erase block including logical addresses 32 and 34 is on the physical addresses 352 to 383, and one erase block including logical address 64 is on the physical addresses 384 to 415. Referring to the link table 53, it is recognized that physical addresses 0 to 31 and 32 to 63 are invalid blocks in which data has been already erased. Hence, the semiconductor memory card 110b copies the data in the physical address space at physical addresses 352 to 383 and 384 to 415, to an area in the physical address space at physical addresses 0 to 31 and 32 to 63. Then, data is erased at physical addresses 352 to 383 and 384 to 415.

Along with this process, the logical-physical address conversion table 51 and link table 53 are updated. FIG. 18 shows the logical-physical address conversion table 51 and link table 53 upon completion of the above process. In the drawing, the shaded area is the newly updated portion. As shown in the logical-physical address conversion table 51, address 0 to address 63 in the physical address space for the first recording area 271 are assigned to address 32 to address 95 in the logical address space. As shown in the link table 53, the newly assigned address 0 to address 63 in the physical address space are assigned for valid block ("00"), and the address 352 to address 415 in the physical address space in which data has been erased are assigned for invalid block ("11").

<Seq. 4: Write Operation of File Data>

In Seq. 4, data of 16 kB (=32 sectors) is written from logical address 128. The semiconductor memory card 110b refers to the FS management information storage register 26, and judges if the logical address specified by Write command is an address stored in the FS management information storage register 26. In this example, since the logical address 128 is not stored in the FS management information storage register 26, the semiconductor memory card 110b judges that the type of write data to be "file data" and write process in the second recording area 272 is executed.

Specifically, the semiconductor memory card 110b refers to the link table 53 in FIG. 18, and recognizes that the physical addresses 352 to 383 for the second recording area 272 are invalid blocks with erased data, and assigns this physical address space (address 352 to address 383) to the logical address space (erase block including address 128), actually writes data into the second recording area 272. Upon completion of this process, the address management information is changed to as shown in FIG. 19. As shown in the drawing, in the logical-physical address conversion table 51, the logical address space (address 128 to address 159) is assigned to the physical address space (address 352 to address 383), and at the same time, the physical address space (address 352 to address 383) with data recorded in the link table 53 is changed to valid block ("00").

<Seq. 5 to 7: Write Operation of File System Management Information>

In Seq. 5 to 7, file system management information of FAT 1, FAT 2, and directory entry (DIR) is written to the corresponding logical addresses 32, 34, and 64.

The semiconductor memory card 110b refers to the FS management information storage register 26, and judges if the logical address specified by Write command exists in the FS management information storage register 26. In this example, since logical addresses 32, 34, and 64 all exist in the FS management information storage register 26, the semiconductor memory card 110b judges that the type of write data is "file system management information", and executes write process to the first recording area 271.

Specifically, the semiconductor memory card 110b refers to the logical-physical address conversion table 51 in FIG. 19, and recognizes that the physical addresses (addresses 0, 2, and 32) have been already assigned to the specified logical addresses (addresses 32, 34, and 64). Further, the semiconductor memory card 110b refers to the link table 53, and recognizes that physical addresses 64 to 66 for the first recording area 271 are invalid blocks with erased data. Then the memory card 110b assigns the physical address space (addressees 64 to 66) to the logical address space (addresses 32, 34, and 64), and writes the data actually to the first recording area 271. The physical area (addresses 0, 2, and 32) previously storing data turns to be managed as invalid block ("10") with data not erased. FIG. 20 shows the address management information after completion of the above process.

<Seq. 8: Write Operation of File Data>

In Seq. 8, 16 kB of data (=32 sectors) from logical address 160 is written. The semiconductor memory card 110b refers to the FS management information storage register 26, and judges if the logical address specified by Write command is included in the FS management information storage register 26. In this example, since the logical address 160 does not exist in the FS management information storage register 26, the semiconductor memory card 110b judges that the type of write data is "file data", and executes write operation to the second recording area 272.

Specifically, the semiconductor memory card 110b refers to the link table in FIG. 20, recognizes that physical addresses 384 to 415 for the second recording area are invalid blocks with erased data, assigns the physical address space (addresses 384 to 415) to the logical address space (erase block including address 160), and actually writes data to the second recording area 272. Upon completion of this process, the address management information is changed to as shown in FIG. 21.

Even if write operation for the file data and file system management information including FAT 1, FAT 2, and directory entry (DIR) is repeated as mentioned above, as shown in FIG. 21, file system management information and file data do not coexist in one erase block. Thus, lowering of access speed does not occur due to coexistence of various data differing in data size to be recorded at once in one erase block.

Thus, the semiconductor memory card of the embodiment has a FS management information storage register for acquiring and holding position or size of the file system management information from the accessing apparatus, and judges the data type from the specified address by referring to the value stored in the register when write command is issued from the accessing apparatus. Further, the semiconductor memory card changes the write method depending on the result of judging the data type, so that data can be written to the semiconductor memory card at high speed.

In the embodiment, the example of FAT system is mainly explained, but the invention may be applied to UDF and other file systems. Arguments of SetFSInfoAddr command and Write command are just example, and other formats are available, or other arguments than that mentioned in the embodiments may be added.

Although the present invention has been described in connection with specified embodiments thereof, many other modifications, corrections and applications are apparent to those skilled in the art. Therefore, the present invention is not limited by the disclosure provided herein but limited only to the scope of the appended claims.

Industrial Applicability

In the semiconductor memory card and accessing apparatus of the invention, the accessing apparatus specifies the type of data to be written to the semiconductor memory card, and the data storage position is changed depending on the type of the data in the semiconductor memory card. Hence it is possible to prevent shortening of life of semiconductor memory card caused by updating of file system management information. Such semiconductor memory card is useful to information recording medium with an accessing apparatus such as digital AV device, mobile telephone terminal, or PC.

The invention claimed is:

1. An information recording medium for storing data managed by a file system, comprising:
    a first physical recording area in which file system management is managed;
    a second physical recording area in which file data is managed;
    a first receiver operable to receive a position setting command for setting a position and a size of the first recording area, the position setting command including an address which is a logical address and a size of the first recording area;
    a storage operable to store the address included in the position setting command received by the first receiver;
    a second receiver operable to receive a write command for writing data, the write command including an address which is a logical address, and write data; and
    a selector operable to select the first or second physical recording area as an access area according to the address stored in the storage and the address included in the write command received by the second receiver,
    wherein the selector
        selects the first physical recording area as an access area when the address stored in the storage matches the address included in the received write command, and
        selects the second physical recording area as an access area when the address stored in the storage does not match the address included in the received write command.

2. The information recording medium according to claim 1, further comprising:
    an area for storing address management information for managing correspondence of physical address and logical address of the first and second recording areas.

3. The information recording medium according to claim 2,
    wherein the address management information includes information about write position of data.

4. The information recording medium of claim 1,
    wherein the first physical recording area and second physical recording area are provided on mutually different storage devices.

5. The information recording medium according to claim 4,
    wherein the different storage devices have different characteristics of rewrite life.

6. The information recording medium of claim 1,
    wherein the first and second physical recording areas are provided on a same storage device.

7. An accessing apparatus for accessing the information recording medium according to claim 1, comprising:
    a slot for loading the information recording medium;
    an access controller operable to control writing and reading of data in the information recording medium loaded in the slot; and a file system controller operable to control the file system established on the information recording medium loaded in the slot, and transmit data and information about a data type to the information recording medium, when writing to the information recording medium.

8. The accessing apparatus of claim 7,
wherein the file system controller specifies, as the data type, a type indicating data entity or file system management information.

9. An accessing apparatus for accessing the information recording medium according to claim 1, comprising:
a FS management information noticer operable to inform the information recording medium of information about position and size of file system management information,
wherein the FS management information noticer informs the information recording medium of information about position and size of file system management information, prior to writing of the file system management information.

10. A method of accessing the information recording medium according to claim 1, comprising transmitting information about data type of writing data to the information recording medium together with the write command.

11. The information recording medium according to claim 1, wherein the file system management information is smaller in data size than the file data.

12. The information recording medium according to claim 1,
wherein data type is specified by an argument of the write command, and the selector judges a data type on a basis of a value of the argument.

13. A control method, of an information recording medium, for storing data managed by a file system, comprising:
managing file system management information in a first physical recording area;
managing file data in a second physical recording area;
receiving a position setting command for setting a position and a size of the first recording area, the positions setting command including an address which is a logical address and a size of the first recording area;
storing the address included in the received position setting command in a storage;
receiving a write command for writing data, the write command including an address which is a logical address, and write data; and
selecting the first physical recording area as an access area when the address stored in the storage matches the address included in the received write command, and
selecting the second physical recording area as an access area when the address stored in the storage does not match the address included in the received write command.

14. The control method according to claim 13, further comprising:
receiving information about a data type together with the write command, and judging the data type on a basis of the received information about data type.

* * * * *